US 9,556,958 B2

(12) United States Patent
Tsukamoto et al.

(10) Patent No.: US 9,556,958 B2
(45) Date of Patent: Jan. 31, 2017

(54) SHIFT-DRUM SPEED CHANGE MECHANISM

(71) Applicant: KANZAKI KOKYUKOKI MFG. CO., LTD., Amagasaki-shi, Hyogo (JP)

(72) Inventors: Michio Tsukamoto, Amagasaki (JP); Shuji Nishimoto, Amagasaki (JP); Daisuke Murashima, Amagasaki (JP)

(73) Assignee: Kanzaki Kokyukoki Mfg. Co., Ltd., Amagasaki-shi (JP)

( * ) Notice: Subject to any disclaimer, the term of this patent is extended or adjusted under 35 U.S.C. 154(b) by 0 days.

(21) Appl. No.: 14/950,977

(22) Filed: Nov. 24, 2015

(65) Prior Publication Data

US 2016/0146344 A1 May 26, 2016

(30) Foreign Application Priority Data

Nov. 26, 2014 (JP) ................................ 2014-238469
Dec. 8, 2014 (JP) ................................ 2014-247981
Dec. 17, 2014 (JP) ................................ 2014-254675

(51) Int. Cl.
  *F16H 59/04* (2006.01)
  *F16H 63/18* (2006.01)
  *F16H 61/26* (2006.01)

(52) U.S. Cl.
  CPC ............. *F16H 63/18* (2013.01); *F16H 61/26* (2013.01)

(58) Field of Classification Search
  CPC ..... F16H 63/18; F16H 61/26; F16H 2063/202
  USPC .............................. 74/473.37, 337.5, 473.36
  See application file for complete search history.

(56) References Cited

U.S. PATENT DOCUMENTS

| 2007/0284849 | A1* | 12/2007 | Kosugi | B62M 25/06 280/288.4 |
| 2010/0275713 | A1* | 11/2010 | Penttila | B62K 5/01 74/473.3 |
| 2014/0083228 | A1* | 3/2014 | Mitsubori | F16H 63/18 74/473.36 |
| 2014/0090499 | A1* | 4/2014 | Fernandez | F16H 59/0208 74/335 |
| 2014/0238758 | A1* | 8/2014 | Barth | B60K 6/48 180/65.25 |
| 2014/0338484 | A1* | 11/2014 | Maki | F16H 61/68 74/337.5 |
| 2015/0059508 | A1* | 3/2015 | Ekonen | F16H 63/38 74/473.1 |
| 2015/0134212 | A1* | 5/2015 | Iizuka | F16H 61/688 701/53 |
| 2015/0152964 | A1* | 6/2015 | Tanaka | F16H 59/02 74/473.16 |

* cited by examiner

*Primary Examiner* — William Kelleher
*Assistant Examiner* — Zakaria Elahmadi
(74) *Attorney, Agent, or Firm* — Sterne, Kessler, Goldstein & Fox P.L.L.C.

(57) ABSTRACT

A shift-drum speed change mechanism includes a first drum spring biasing a first drum toward a first side in an axial direction, which is a side on which a first slider comes into contact with a first speed change member, a first fork spring biasing a first shift fork toward a second side in the axial direction, which is a side opposite to the first side in the axial direction, with a weaker biasing force than the first drum spring, and a first stopper member for the first drum, defining an end of movement of the first drum toward the first side in the axial direction.

18 Claims, 19 Drawing Sheets

SHIFT-DRUM SPEED CHANGE MECHANISM

BACKGROUND OF THE INVENTION

Field of the Invention

The present invention relates to a shift-drum speed change mechanism.

Related Art

Shift-drum speed change mechanisms have been proposed and used as speed change mechanisms that are disposed in the driveline of utility vehicles, all-train vehicles, off-road vehicles, etc.

For example, JP2014-070650A (hereinafter referred to as Patent Document 1, which has a corresponding U.S. application publication No. US 2014/0083228A1) discloses a shift-drum speed change mechanism comprising an operation shaft rotated around the axis; a drum supported by the operation shaft so as to be incapable of relative rotation and provided with, on the outer circumferential surface, a first guide groove for switching between high and low speeds and a second guide groove for switching between forward and reverse; a first shift fork having a first engagement pin inserted into the first guide groove; a second shift fork having a second engagement pin inserted into the second guide groove; a fork shaft supporting the first and second shift forks so as to be movable in the axial direction; a high gear, a low gear, and a reverse/parking gear supported by a power transmission rotating shaft; a first slider that is supported by the power transmission rotating shaft so as to be incapable of relative rotation around the axis and movable in the axial direction between the high gear and the low gear, and is moved in the axial direction by the first shift fork so as to be capable of taking a high-speed position where the first slider is engaged with the high gear, a neutral position where the first slider is not engaged with any of the high and low gears, and a low-speed position where the first slider is engaged with the low gear; and a second slider that is supported by the power transmission rotating shaft so as to be incapable of relative rotation around the axis and movable in the axial direction while facing the reverse/parking gear, and is moved in the axial direction by the second shift fork so as to be capable of taking a reverse/parking position where the second slider is engaged with the reverse/parking gear and a neutral position where the second slider is not engaged with the reverse-parking gear.

The conventional shift-drum speed change mechanism described in Patent Document 1 further has a shift spindle that is rotated around the axis in accordance with manual operation and is operatively connected to the operation shaft, and a parking mechanism operatively connected to the shift spindle.

The shift spindle takes a high-speed position, a low-speed position, a reverse position, and a parking position around the axis, and the parking mechanism brings the reverse/parking gear into a rotation suspended state only when the shift spindle is operated to the parking position.

The first and second guide grooves are configured to provide a high-speed state where the second slider is placed at the neutral position and the first slider is placed at the high-speed position to be engaged with the high gear when the operation shaft is placed at the high-speed position around the axis in accordance with the operation of the shift spindle to the high-speed position; a low-speed state where the second slider is placed at the neutral position and the first slider is placed at the low-speed position to be engaged with the low gear when the operation shaft is placed at the low-speed position around the axis in accordance with the operation of the shift spindle to the low-speed position; a reverse state where the first slider is placed at the neutral position and the second slider is placed at the reverse/parking position to be engaged with the reverse/parking gear when the operation shaft is placed at the reverse position around the axis in accordance with the operation of the shift spindle to the reverse position; and a parking state where the first slider is placed at the neutral position and the second slider is placed at the reverse/parking position to be engaged with the reverse/parking gear that is in a state where the rotation is forcibly suspended by the parking mechanism, when the operation shaft is placed at the parking position around the axis in accordance with the operation of the shift spindle to the parking position.

Meanwhile, when connecting the first or second slider to the corresponding speed change gear, if the circumferential positions of engagement part provided on the slider and engagement part provided on the corresponding speed change gear match, (i.e., if projections or depressions of the engagement part of the slider face depressions or projections of the projection/depression engagement part of the speed change gear), the slider can be immediately connected to the corresponding speed change gear.

Accordingly, an operator can immediately complete the manual operation for placing the operation shaft at the desired speed change position in this case.

However, if the circumferential positions of the engagement part of the slider and the engagement part of the corresponding speed change gear do not match (i.e., if the projections, or the depressions, of the engagement parts of the slider and the speed change member face each other), the slider cannot be pushed to the position where the slider is connected to the corresponding speed change gear.

In such a case, the operator has to continue operating the operation shaft around the axis toward the desired speed change position until the circumferential positions of the engagement parts of the slider and the speed change gear match so that the slider is actually connected to the speed change gear.

Moreover, the conventional shift-drum speed change mechanism disclosed in Patent Document 1 also has room for improvement on the following point.

That is, with the conventional shift-drum speed change mechanism, the operation shaft is retained at the parking/reverse position when the shift spindle is operated from the parking position to the reverse position, and the parking mechanism provides a parking state where the rotation of the reverse/parking gear is forcibly suspended when the shift spindle is placed at the parking position, and provides a reverse state by cancelling the forced suspension of the rotation of the reverse/parking gear when the shift spindle is operated from the parking position to the reverse position.

In this way, the conventional shift-drum speed change mechanism can selectively provide four speed change states of a forward high-speed state, a forward low-speed state, a parking state, and a reverse state by operating the shift spindle around the axis, but is problematic in that the order of the four speed change states are fixed.

More specifically, with the conventional shift-drum speed change mechanism above, for example, the shift spindle is operated from the parking position to the forward high-speed position through the forward low-speed position when the speed change state is changed from the parking state to the forward high-speed state. During the course of this speed change, the forward low-speed state is always reached.

That is, when the shift spindle is operated from the parking position to the forward high-speed position, the forward low-speed position is passed through during the course of this operation. At this time, the first slider is always placed at the forward low-speed position and engaged with the forward low-speed gear so that the shift-drum speed change mechanism arrives at the forward low-speed state.

Thereafter, when the shift spindle passes through the forward low-speed position and then reaches the forward high-speed position, the first slider is moved from the forward low-speed position to the forward high-speed position through the neutral position and is engaged with the forward high-speed gear so that the shift-drum speed change mechanism arrives at the forward high-speed state.

The same applies to the case where the speed change state is changed from the forward high-speed state to the parking state, and in the case where a speed change operation is performed between the forward low-speed state and the reverse state as well, the parking state is always reached during the course of the operation.

SUMMARY OF THE INVENTION

The present invention has been conceived in view of the conventional art described above, and an object of the present invention is to provide a shift-drum speed change mechanism wherein an operation shaft by which a drum is supported so as to be incapable of relative rotation is rotated around the axis to move a shift fork and a slider in the axial direction by a guide groove formed in the drum and cause the slider to be engaged with the corresponding speed change member to perform a speed change operation, with which manual operation on the operation shaft can be completed as promptly as possible.

In order to achieve the object, the present invention provides a shift-drum speed change mechanism including a first slider that is supported by a power transmission rotating shaft so as to be incapable of relative rotation and movable in an axial direction between first and second speed change members relatively rotatable relative to the power transmission rotating shaft, and is capable of selectively taking a first speed change position where the first slider is engaged with the first speed change member, a neutral position where the first slider is not engaged with any of the first and second speed change members, and a second speed change position where the first slider is engaged with the second speed change member; a first shift fork that is supported so as to be movable in the axial direction, and causes the first slider to move in the axial direction in accordance with its own movement in the axial direction; a first drum provided with a first guide groove into which a first engagement pin of the first shift fork is inserted; and an operation shaft supporting the first drum so as to be incapable of relative rotation and movable in the axial direction, wherein the operation shaft is operable around an axis so as to be capable of taking a neutral position as well as first and second speed change positions when rotated from the neutral position toward one side and the other side around the axis, respectively, and the first slider is placed at the neutral position, the first speed change position, and the second speed change position in accordance with operation of the operation shaft to the neutral position, the first speed change position, and the second speed change position, respectively, the shift-drum speed change mechanism further including a first drum spring biasing the first drum toward a first side in the axial direction, which is a side on which the first slider comes close to the first speed change member; a first fork spring biasing the first shift fork toward a second side in the axial direction, which is a side opposite to the first side in the axial direction, with a weaker biasing force than the first drum spring; and a first stopper member for the first drum, defining an end of movement of the first drum toward the first side in the axial direction.

According to the shift-drum speed change mechanism of the present invention, even in a case where the first slider cannot be immediately moved to a desired speed change position since the engagement part of the first slider collies with the engagement part of a corresponding speed change member when the operational shaft is operated form the neutral position to the first or second speed change position, it is possible to first operate only the operation shaft to a desired speed change position from a neutral position without actually having the first slider positioned at the desired speed change position, and then to have the first slider positioned at desired speed change position by a biasing force of the first drum spring of the first fork spring without manually operating the operation shaft.

Moreover, the shift-drum speed change mechanism of the present invention makes it possible to accurately and stably have the first drum positioned at a reference position defined by the first stopper member for the first drum, thereby accurately and stably performing a position control of the first slider.

Preferably, the shift-drum speed change mechanism of the present invention may further include a second stopper member for the first drum that defines an end of movement of the first drum toward the second side in the axial direction.

The second stopper member for the first drum is disposed such a position as to provide a gap between the second stopper member for the first drum and the first drum in contact with the first stopper member for the first drum.

In a first aspect, the shift-drum speed change mechanism of the present invention may further include third and fourth speed change members supported so as to be relatively rotatable around the axis relative to the power transmission rotating shaft; a second slider that is supported by the power transmission rotating shaft so as to be incapable of relative rotation around the axis and movable in the axial direction between the third and fourth speed change members, and is capable of selectively taking a third speed change position where the second slider is engaged with the third speed change member, a neutral position where the second slider is not engaged with any of the third and fourth speed change members, and a fourth speed change position where the second slider is engaged with the fourth speed change member; a second shift fork that is supported so as to be movable in the axial direction, and causes the second slider to move in the axial direction in accordance with its own movement in the axial direction; a second drum that is supported by the operation shaft so as to be incapable of relative rotation around the axis and movable in the axial direction, and is provided with a second guide groove into which a second engagement pin of the second shift fork is inserted; a second drum spring biasing the second drum toward the first side in the axial direction; a second fork spring biasing the second shift fork toward the second side in the axial direction with a weaker biasing force than the second drum spring; and a first stopper member for the second drum, defining an end of movement of the second drum spring toward the first side in the axial direction.

In this case, the operation shaft is configured to take a third speed change position when rotated from the first speed change position toward one side around the axis and a fourth speed change position when rotated from the second speed change position toward the other side around the axis, in addition to the neutral position, the first speed change position, and the second speed change position.

The first guide groove is configured to have a neutral engagement part, a first-speed-change engagement part, a second-speed-change engagement part, a third-speed-change engagement part, and a fourth-speed-change engagement part with which the first engagement pin is engaged when the operation shaft is placed at the neutral position, the first speed change position, the second speed change position, the third speed change position, and the fourth speed change position, respectively.

The second guide groove is configured to have a neutral engagement part, a first-speed-change engagement part, a second-speed-change engagement part, a third-speed-change engagement part, and a fourth-speed-change engagement part with which the second engagement pin is engaged when the operation shaft is placed at the neutral position, the first speed change position, the second speed change position, the third speed change position, and the fourth speed change position, respectively.

The third-speed-change engagement part of the first guide groove is disposed adjacent to the first-speed-change engagement part on an opposite side of the first-speed-change engagement part from the neutral engagement part, and is engaged with the first engagement pin such that the first shift fork is retained at a central reference position with respect to the axial direction relative to the first drum.

The fourth-speed-change engagement part of the first guide groove is disposed adjacent to the second-speed-change engagement part on an opposite side of the second-speed-change engagement part from the neutral engagement part, and is engaged with the first engagement pin such that the first shift fork is retained at the central reference position with respect to the axial direction relative to the first drum.

The first-speed-change engagement part, the neutral engagement part, and the second-speed-change engagement part of the second guide groove are engaged with the second engagement pin such that the second shift fork is retained at a central reference position with respect to the axial direction relative to the second drum.

The third-speed-change engagement part of the second guide groove is disposed adjacent to the first-speed-change engagement part on an opposite side of the first-speed-change engagement part from the neutral engagement part, and is engaged with the second engagement pin such that the second shift fork is retained at a first displaced position where the second shift fork is displaced from the central reference position toward the first side in the axial direction relative to the second drum.

The fourth-speed-change engagement part of the second guide groove is disposed adjacent to the second-speed-change engagement part on an opposite side of the second-speed-change engagement part from the neutral engagement part, and is engaged with the second engagement pin such that the second shift fork is retained at a second displaced position where the second shift fork is displaced from the central reference position toward the second side in the axial direction relative to the second drum.

The shift-drum speed change mechanism according to the first aspect of the present invention may further include a second stopper member for the second drum that defines an end of movement of the second drum toward the second side in the axial direction.

The second stopper member for the second drum is disposed such a position as to provide a gap between the second stopper member for the second drum and the second drum in contact with the first stopper member for the second drum.

In a second aspect, the shift-drum speed change mechanism of the present invention may further include a second slider that is supported by the power transmission rotating shaft so as to be incapable of relative rotation around the axis and movable in the axial direction between third and fourth speed change members, which are relatively rotatable relative to the power transmission rotating shaft, and is capable of selectively taking a third speed change position where the second slider is engaged with the third speed change member, a neutral position where the second slider is not engaged with any of the third and fourth speed change members, and a fourth speed change position where the second slider is engaged with the fourth speed change member; a second shift fork that is supported so as to be movable in the axial direction, and causes the second slider to move in the axial direction in accordance with its own movement in the axial direction; and a second fork spring biasing the second shift fork toward the second side in the axial direction.

In this case, the first drum is provided with, in addition to the first guide groove, a second guide groove into which a second engagement pin of the second shift fork is inserted.

A combined biasing force of the first and second fork springs is smaller than a biasing force of the first drum spring.

The operation shaft is configured to take, in addition to the neutral position, the first speed change position, and the second speed change position, a third speed change position when rotated from the first speed change position toward one side around the axis and a fourth speed change position when rotated from the second speed change position toward the other side around the axis.

The first guide groove is configured to have a neutral engagement part, a first-speed-change engagement part, a second-speed-change engagement part, a third-speed-change engagement part, and a fourth-speed-change engagement part with which the first engagement pin is engaged when the operation shaft is placed at the neutral position, the first speed change position, the second speed change position, the third speed change position, and the fourth speed change position, respectively.

The second guide groove is configured to have a neutral engagement part, a first-speed-change engagement part, a second-speed-change engagement part, a third-speed-change engagement part, and a fourth-speed-change engagement part with which the second engagement pin is engaged when the operation shaft is placed at the neutral position, the first speed change position, the second speed change position, the third speed change position, and the fourth speed change position, respectively.

The third-speed-change engagement part of the first guide groove is disposed adjacent to the first-speed-change engagement part on an opposite side of the first-speed-change engagement part from the neutral engagement part, and is engaged with the first engagement pin such that the first shift fork is retained at a central reference position with respect to the axial direction relative to the first drum.

The fourth-speed-change engagement part of the first guide groove is disposed adjacent to the second-speed-change engagement part on an opposite side of the second-speed-change engagement part from the neutral engagement part, and is engaged with the first engagement pin such that the first shift fork is retained at the central reference position with respect to the axial direction relative to the first drum.

The first-speed-change engagement part, the neutral engagement part, and the second-speed-change engagement part of the second guide groove are engaged with the second engagement pin such that the second shift fork is retained at the central reference position for the second shift fork with respect to the axial direction relative to the first drum.

The third-speed-change engagement part of the second guide groove is disposed adjacent to the first-speed-change engagement part on an opposite side of the first-speed-change engagement part from the neutral engagement part, and is engaged with the second engagement pin such that the second shift fork is retained at a first displaced position for the second shift fork displaced toward the first side in the axial direction from the central reference position for the second shift fork relative to the first drum.

The fourth-speed-change engagement part of the second guide groove is disposed adjacent to the second-speed-change engagement part on an opposite side of the second-speed-change engagement part from the neutral engagement part, and is engaged with the second engagement pin such that the second shift fork is retained at a second displaced position for the second shift fork where the second shift fork is displaced toward the second side in the axial direction from the central reference position for the second shift fork relative to the first drum.

In the shift-drum speed change mechanism according to the first and second aspect, the neutral engagement part and the fourth-speed-change engagement part of the first guide groove preferably have such a groove width for engagement with the first engagement pin that the first shift fork is retained at the central reference position with respect to the axial direction relative to the first drum; and the second-speed-change engagement part has such a groove width for engagement with the engagement pin that the first shift fork is relatively movable with respect to the axial direction relative to the first drum between the central reference position and the second displaced position where the first shift fork is displaced from the central reference position toward the second side in the axial direction.

Moreover, another object of the present invention is to provide a shift-drum speed change mechanism which includes a drum member that has first and second guide grooves into which the engagement pins of the first and second shift forks are inserted, respectively, and that is capable of taking at least a reference rotational position, a rotational position more toward one side around the axis than the reference rotational position is, and a rotational position more toward the other side around the axis than the reference rotational position is, and provides speed change states in accordance with the rotational positions of the operated drum member, the shift-drum speed change mechanism capable of performing a speed change operation from a speed change state corresponding to the rotational position on one side of the reference rotational position around the axis or from a speed change state corresponding to the rotational position on the other side of the reference rotational position around the axis to a speed change state corresponding to the reference rotational position, and also capable of performing a speed change operation between a speed change state corresponding to the rotational position on one side around the axis and the speed change state corresponding to the rotational position on the other around the axis without arriving at the speed change state corresponding to the reference rotational position.

In order to achieve the object, the present invention further provides a shift-drum speed change mechanism including first and second sliders supported by a power transmission rotating shaft so as to be incapable of relative rotation and movable in an axial direction; at least one first-slider speed change member and at least one second-slider speed change member relatively rotatable relative to the power transmission rotating shaft; first and second shift forks that are supported so as to be movable in the axial direction and, in accordance with their own movement in the axial direction, cause the first and second sliders to move in the axial direction, respectively; a drum member that has first and second guide grooves into which first and second engagement pins of the first and second shift forks are inserted, respectively, and is capable of taking around the axis at least a reference rotational position, a first-side-around-axis first rotational position when rotated predetermined degrees from the reference rotational position toward one side around the axis, and a second-side-around-axis first rotational position when rotated predetermined degrees from the reference rotational position toward the other side around the axis in accordance with manual operation; and a first fork spring biasing the first shift fork, wherein the first shift fork is capable of taking a reference position where the first slider is separated from the first-slider speed change member and a displaced position where the first slider is engaged with the first-slider speed change member so that both components are rotated integrally; the first fork spring biases the first shift fork toward the displaced position; the second shift fork is capable of taking a reference position where the second slider is separated from the second-slider speed change member and a displaced position where the second slider is engaged with the second-slider speed change member so that both components are rotated integrally; the first guide groove has such a groove shape for engagement with the first engagement pin that the first shift fork is allowed to move in the axial direction between the reference position and the displaced position when the drum member is placed at the reference rotational position, the first shift fork is retained at the reference position when the drum member is placed at the first-side-around-axis first rotational position and at the second-side-around-axis first rotational position, and the first shift fork is moved toward the reference position against a biasing force of the first fork spring as an amount of rotation from the reference rotational position is increased when the drum member is rotated from the reference rotational position to the first-side-around-axis first rotational position and to the second-side-around-axis first rotational position; and the second guide groove has such a groove shape for engagement with the second engagement pin that the second shift fork is retained at the reference position when the drum member is placed at the reference rotational position, the second shift fork is moved from the reference position to the displaced position as the drum member is rotated from the reference rotational position to one of the first-side-around-axis first rotational position and the second-side-around-axis first rotational position, the second shift fork is retained at the displaced position when the drum member is placed at the one rotational position, and the second shift fork is moved from the displaced position to the reference position as the drum member is rotated from the one rotational position to the reference rotational position.

According to the shift-drum speed change mechanism of the present invention, it is possible to perform a normal speed change operation in which a first-side-around-axis speed change state (for example, a neutral state) corresponding to the rotational position of the drum member on one side of the reference rotational position around the axis or a second-side-around-axis speed change state (for example, a parking state) corresponding to the rotational position of the drum member on the other around the axis is shifted to a reference speed change state (for example, a reverse state) corresponding to the reference rotational position, and also possible to perform a speed change operation in which the first-side-around-axis speed change state and the second-side-around-axis speed change state are shifted from each other without arriving at the reference speed change state.

In a case where the drum member includes a first drum provided with the first guide groove and a second drum provided with the second guide groove, the shift-drum speed change mechanism of the present invention may further includes a second fork spring biasing the second shift fork in the same direction as the biasing direction of the first shift fork by the first fork spring; a first drum spring biasing the first drum with a greater biasing force than the first fork spring toward a first side in the axial direction that is a direction opposite to the biasing direction of the first shift fork by the first fork spring; a second drum spring biasing the second drum with a greater biasing force than the second fork spring toward the first side in the axial direction; a first stopper member for the first drum, defining an end of movement of the first drum toward the first side in the axial direction; a second stopper member for the first drum that defines an end of movement of the first drum toward a second side opposite to the first side in the axial direction, and is disposed so as to provide a gap between the second stopper member for the first drum and the first drum in contact with the first stopper member for the first drum; a first stopper member for the second drum, defining an end of movement of the second drum toward the first side in the axial direction; and a second stopper member for the second drum that defines an end of movement of the second drum toward the second side in the axial direction, and is disposed so as to provide a gap between the second stopper member for the second drum and the second drum in contact with the first stopper member for the second drum.

In another case where the drum member is a single component provided with the first and second guide grooves, the shift-drum speed change mechanism of the present invention may further include a second fork spring biasing the second shift fork in the same direction as the biasing direction of the first shift fork by the first fork spring; a drum spring biasing the drum member with a greater biasing force than a combined biasing force of the first fork spring and the second fork spring toward a first side in the axial direction that is a direction opposite to the biasing direction of the first shift fork by the first fork spring; a first stopper member for the drum, defining an end of movement of the drum member toward the first side in the axial direction; and a second stopper member for the drum that defines an end of movement of the drum member toward a second side opposite to the first side in the axial direction, and is disposed so as to provide a gap between the second stopper member for the drum and the drum member in contact with the first stopper member for the drum.

In a first aspect, the second guide groove may have such a groove shape for engagement with the second engagement pin that the second shift fork is moved from the reference position to the displaced position as the drum member is rotated from the reference rotational position to the second-side-around-axis first rotational position, the second shift fork is retained at the displaced position when the drum member is placed at the second-side-around-axis first rotational position, the second shift fork is moved from the displaced position to the reference position as the drum member is rotated from the second-side-around-axis first rotational position to the reference rotational position, and the second shift fork is retained at the reference position when the drum member is rotated between the reference rotational position and the first-side-around-axis first rotational position.

In the first aspect, the first-slider speed change member preferably has a first-side-along-axis first-slider speed change member and a second-side-along-axis first-slider speed change member, disposed on the respective sides of the first slider in the axis direction; and the second-slider speed change member preferably has a first-side-along-axis second-slider speed change member and a second-side-along-axis second-slider speed change member, disposed on the respective sides of the second slider in the axis direction.

In this case, the first shift fork separates the first slider from both the first-side-along-axis first-slider speed change member and the second-side-along-axis first-slider speed change member when placed at the reference position, and is configured to be capable of taking, as the displaced position, a first displaced position where the first slider is engaged with the first-side-along-axis first-slider speed change member so that both components are rotated integrally and a second displaced position where the first slider is engaged with the second-side-along-axis first-slider speed change member so that both components are rotated integrally.

The second shift fork separates the second slider spaced from both the first-side-along-axis second-slider speed change member and the second-side-along-axis second-slider speed change member when placed at the reference position, and is configured to be capable of taking, as the displaced position, a first displaced position where the second slider is engaged with the first-side-along-axis second-slider speed change member so that both components are rotated integrally and a second displaced position where the second slider is engaged with the second-side-along-axis second-slider speed change member so that both components are rotated integrally.

The drum member is configured so as to be capable of further taking a first-side-around-axis second rotational position when rotated predetermined degrees from the first-side-around-axis first rotational position toward one side around the axis, and a first-side-around-axis third rotational position when rotated predetermined degrees from the first-side-around-axis second rotational position toward one side around the axis.

The first guide groove further has such a groove shape for engagement with the first engagement pin that the first shift fork is retained at the first displaced position and the reference position when the drum member is placed at the first-side-around-axis second rotational position and the first-side-around-axis third rotational position, respectively; the first shift fork is moved from the reference position to the first displaced position as the drum member is rotated from the first-side-around-axis first rotational position to the first-side-around-axis second rotational position; and the first shift fork is moved in an opposite direction as the drum member is rotated in an opposite direction, and the first shift fork is moved from the first displaced position to the reference position as the drum member is rotated from the first-side-around-axis second rotational position to the first-side-around-axis third rotational position, and the first shift fork is moved in an opposite direction as the drum member is rotated in an opposite direction.

The second guide groove has such a groove shape for engagement with the second engagement pin that the second shift fork is retained at the reference position when the drum member is rotated between the first-side-around-axis first rotational position and the first-side-around-axis second rotational position; the second shift fork is retained at the first displaced position when the drum member is placed at the first-side-around-axis third rotational position; and the second shift fork is moved from the reference position to the first displaced position as the drum member is rotated from the first-side-around-axis second rotational position to the first-side-around-axis third rotational position, and the second shift fork is moved in an opposite direction as the drum member is rotated in an opposite direction.

In a second aspect, the second-slider speed change member may have a first-side-along-axis second-slider speed change member and a second-side-along-axis second-slider speed change member, disposed on the respective sides of the second slider in the axis direction; the second shift fork separates the second slider from both the first-side-along-axis second-slider speed change member and the second-side-along-axis second-slider speed change member when placed at the reference position, and is configured to be capable of taking, as the displaced position, a first displaced position where the second slider is engaged with the first-side-along-axis second-slider speed change member so that both components are rotated integrally and a second displaced position where the second slider is engaged with the second-side-along-axis second-slider speed change member so that both components are rotated integrally.

In this case, the second guide groove has such a groove shape for engagement with the second engagement pin that the second shift fork is moved from the reference position to the second displaced position as the drum member is rotated from the reference rotational position to the second-side-around-axis first rotational position, the second shift fork is retained at the second displaced position when the drum member is placed at the second-side-around-axis first rotational position, the second shift fork is moved from the second displaced position to the reference position as the drum member is rotated from the second-side-around-axis first rotational position to the reference rotational position, the second shift fork is moved from the reference position to the first displaced position as the drum member is rotated from the reference rotational position to the first-side-around-axis first rotational position, the second shift fork is retained at the first displaced position when the drum member is placed at the first-side-around-axis first rotational position, and the second shift fork is moved from the first displaced position to the reference position as the drum member is rotated from the first-side-around-axis first rotational position to the reference rotational position.

Meanwhile, with the conventional shift-drum speed change mechanism of Patent Document 1 described in the prior-art section above, there may be a case where a desired speed change state cannot be immediately provided.

That is, when the operation shaft is operated toward a desired speed change position (e.g., a forward low-speed position), the first engagement pin is guided by the first guide groove of the drum, and thus the first shift fork pushes the first slider toward a desired speed change position (a forward low-speed position in this case).

At this time, if the engagement part of the first slider is immediately engaged with the engagement part of the forward-low speed gear, the desired speed change state is immediately provided, but if the projections of the engagement part of the first slider and the projections of the engagement part of the forward-low speed gear face each other, there may be a case where the first slider cannot be engaged with the forward low-speed gear.

In such a case, an operator has to continue operating the operation shaft toward a desired speed change position around the axis until the engagement part of the first slider is engaged with the engagement part of the forward low-speed gear.

In light of this point, a shift-drum speed change mechanism is desired in which a shift fork and a slider are moved in the axial direction by a guide groove formed in a drum in accordance with the rotational operation around the axis of an operation shaft that supports the drum so as to be incapable of relative rotation and thereby the slider is engaged with the corresponding speed change member to provide a desired speed change state, and which is capable of exerting a detent action for locking the operation shaft at a desired operational position around the axis by a detent mechanism, and, further, capable of exerting a pushing force on the slider toward a speed change position without requiring additional components when the slider is in a speed change incomplete state from the neutral position toward the speed change position.

The desire can be achieved by a shift-drum speed change mechanism including a speed change member relatively rotatable relative to a power transmission rotating shaft; a slider that is supported by the power transmission rotating shaft so as to be incapable of relative rotation and movable in an axial direction, and is capable of selectively taking, in an axial direction, a neutral position where the slider is not engaged with the speed change member and a speed change position where the slider is engaged with the speed change member; a shift fork that is movable in the axial direction and causes the slider to move in the axial direction in accordance with its own movement in the axial direction; a drum provided with a guide groove into which an engagement pin of the shift fork is inserted; and an operation shaft that supports the drum so as to be incapable of relative rotation and takes operation positions including a neutral position around the axis and a speed change position rotated around the axis from the neutral position, wherein the guide groove guides the engagement pin so that the slider is pressed and moved from the neutral position to the speed change position as the operation shaft is operated from the neutral position to the speed change position, the shift-drum speed change mechanism further including a detent mechanism capable of locking the operation shaft at the respective operation positions, the detent mechanism having a detent projecting member, a biasing member that biases the detent projecting member toward a predetermined part of an outer surface of the operation shaft, and detent depressions that include a depression for the neutral position and a depression for the speed change position formed at the outer surface of the operation shaft so that the detent projecting member biased by the biasing member is engaged into the depression for the neutral position and the depression for the speed change position when the operation shaft is operated at the neutral position and the speed change position around the axis, respectively, the depression for the speed change position having a deepest part that causes the detent projecting member to be placed at the most radially inward part of the operation shaft, and an inclined surface that is located on the side circumferentially closer to the depression for the neutral position than the deepest part is and that ascends toward the depression for the neutral position from the deepest part, and the inclined surface being formed so as to be engaged with the detent projecting member when the slider is at a speed change incomplete position between the neutral position and the speed change position with respect to the axial direction.

In a first aspect, the shift-drum speed change mechanism may further includes a drum spring biasing the drum toward a first side in the axial direction, which is a side on which the slider is away from the speed change member, a first stopper member for the drum, defining an end of movement of the drum toward the first side in the axial direction, and a second stopper member for the drum that defines an end of movement of the drum member toward a second side opposite to the first side in the axial direction, and is disposed so as to provide a gap between the second stopper member for the drum and the drum in contact with the first stopper member for the drum.

In any one of the various configurations, the shift-drum speed change mechanism may include a fork spring biasing the shift fork toward a second side in the axis direction, which is a side on which the slide comes close to the speed change member.

In a second aspect where the shift-drum speed change mechanism further include a second-side-along-axis speed change member that is disposed on an opposite side of the slider from the speed change member and is relatively rotatable relative to the power transmission rotating shaft, the slider is configured to take, in addition to the neutral position and the speed change position, another speed change position in the axial direction that is displaced toward the first side in the axial direction from the neutral position and the slider is engaged with the second-side-along-axis speed change member, the operation shaft is configured to take, as the operation positions, in addition to the neutral position and the speed change position, another speed change position reached when rotated from the neutral position toward an opposite side to the speed change position around the axis, and the detent depressions is configured to include a depression for another speed change position into which the detent projection biased by the detent biasing member is inserted when the operation shaft is placed at another speed change position.

In the second aspect, the shift-drum speed change mechanism may further include a drum spring biasing the drum, which is supported by the operation shaft so as to be movable in the axial direction, toward the first side in the axial direction, which is a side on which the slider is away from the speed change member and comes close to another speed change member, and a first stopper member for the drum, defining an end of movement of the drum toward the first side in the axial direction.

In the various configurations involved in the second aspect, the shift-drum speed change mechanism may further include a second stopper member for the drum, defining an end of movement of the drum toward the second side in the axial direction.

The second stopper member for the drum is disposed such a position as to provide a gap between the second stopper member for the drum and the drum in contact with the first stopper member for the drum.

In a case where the drum spring is provided in the second aspect, the shift-drum speed change mechanism may further include a fork spring biasing the shift fork toward the second side in the axial direction, which is a side on which the slider comes close to the speed change member.

In any one of the various configurations, the speed change member is a fixed component that is incapable of rotation and provides a parking state when the slider is engaged with the speed change member.

The shift fork may be supported by a fork shaft.

Alternatively, the shift fork may be supported around the drum.

BRIEF DESCRIPTION OF THE DRAWINGS

The above, and other objects, features and advantages of the present invention will become apparent from the detailed description thereof in conjunction with the accompanying drawings therein.

DETAILED DESCRIPTION OF THE PREFERRED EMBODIMENTS

Below, one embodiment of the shift-drum speed change mechanism of the present invention will now be described with reference to the appended drawings.

Figure 1:
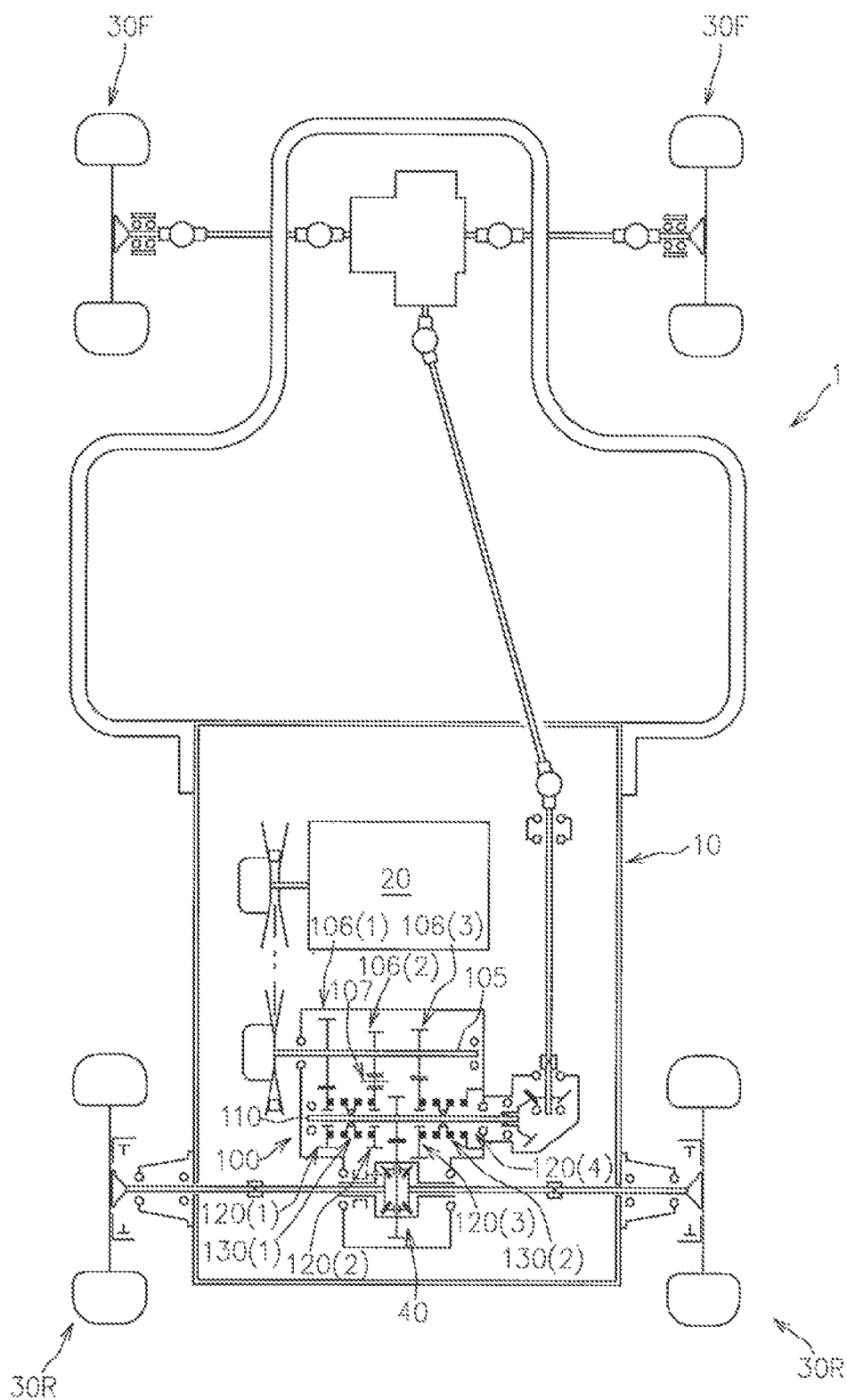
FIG. 1 is a schematic view of a power transmission of a utility vehicle to which a shift-drum speed change mechanism of one embodiment of the present invention is applied.

FIG. 1 shows a schematic view of the power transmission of a utility vehicle 1 to which a shift-drum speed change mechanism 100 of this embodiment is applied.

First, a general configuration of the utility vehicle 1 will now be described with reference to FIG. 1.

As shown in FIG. 1, the utility vehicle 1 comprises a vehicle body 10, an engine 20 supported by the vehicle body 10, front wheels 30F and rear wheels 30R supported by the vehicle body 10, and the shift-drum speed change mechanism 100 disposed in the driveline from the engine 20 to the wheels that serve as drive wheels among the front wheels 30F and the rear wheels 30R.

In this embodiment, both front wheels 30F and rear wheels 30R serve as drive wheels in the utility vehicle 1 as shown in FIG. 1

Specifically, the utility vehicle 1 has right-and-left pairs of rear wheels 30R that serve as main drive wheels and right-and-left pairs of front wheels 30F that serve as auxiliary drive wheels and as steering wheels, and is configured such that the rotative power that has been speed-changed by the shift-drum speed change mechanism 100 is operatively transmitted to the right-and-left pairs of rear wheels 30R and the right-and-left pairs of front wheels 30F.

The power is differentially transmitted from the shift-drum speed change mechanism 100 to the right-and-left pairs of rear wheels 30R via a rear-wheel-side differential gear mechanism 40, and the power is differentially transmitted from the shift-drum speed change mechanism 100 to the right-and-left pairs of front wheels 30F via a front-wheel-side differential gear mechanism (not shown).

Figure 2:
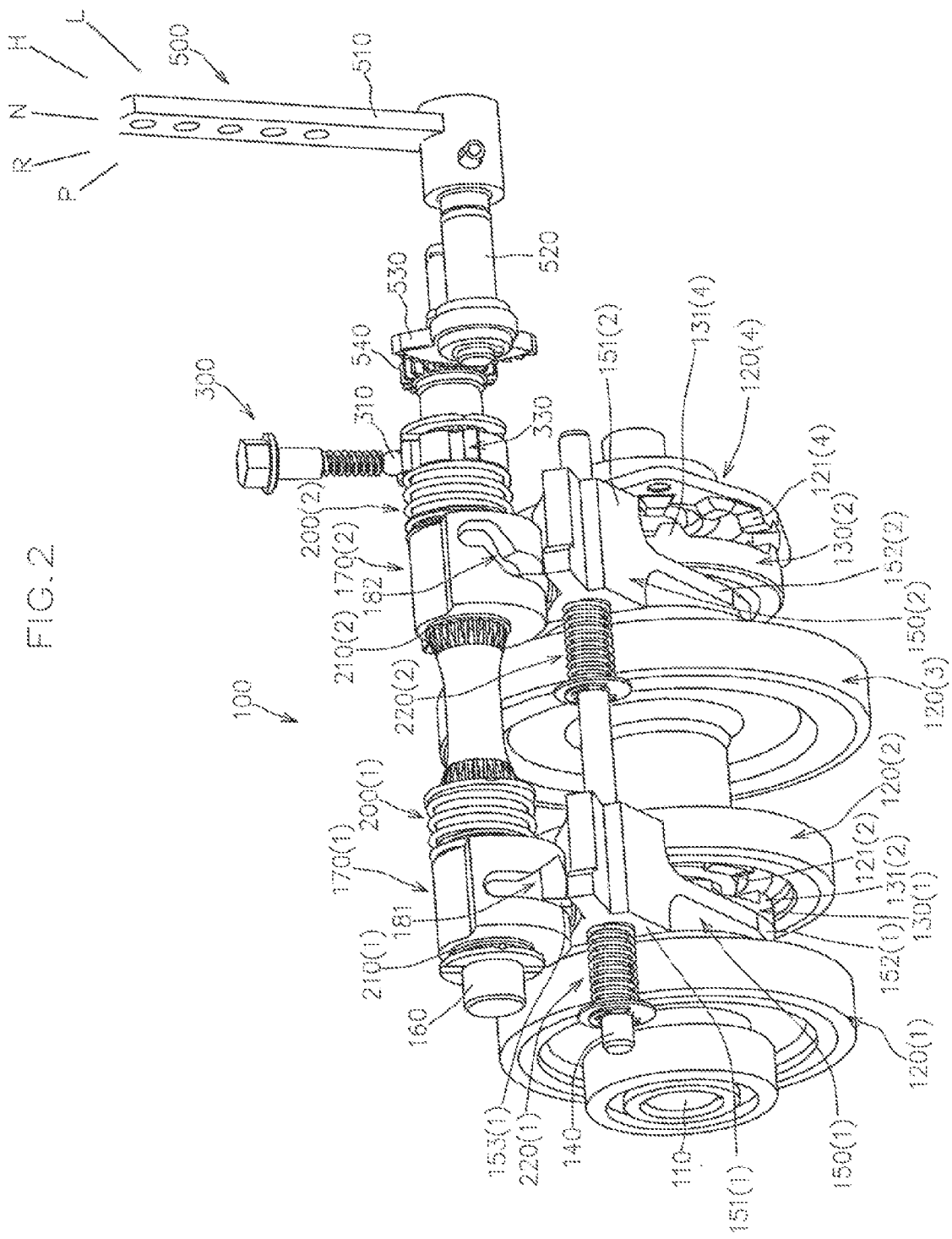
FIG. 2 is a perspective view of the shift-drum speed change mechanism.

FIG. 2 shows a perspective view of the shift-drum speed change mechanism 100 of this embodiment.

As shown in FIGS. 1 and 2, the shift-drum speed change mechanism 100 comprises a power transmission rotating shaft 110 disposed in the driveline; first and second speed change members 120(1) and 120(2) relatively rotatable around the axis relative to the power transmission rotating shaft 110; a first slider 130(1) supported by the power transmission rotating shaft 110 so as to be incapable of relative rotation around the axis and movable in the axial direction between the first and second speed change members 120(1) and 120(2); a fork shaft 140 disposed in parallel with the power transmission rotating shaft 110; a first shift fork 150(1) supported by the fork shaft 140 so as to be movable in the axial direction; an operation shaft 160 disposed in parallel with the fork shaft 140 and rotated around the axis in accordance with manual operation; and a first drum 170(1) supported by the operation shaft 160 so as to be incapable of relative rotation around the axis and movable in the axial direction.

In this embodiment, the operation shaft 160 is rotated around the axis via an operation unit 500 that is manually operated.

As shown in FIG. 2, the operation unit 500 has an operation transmission shaft 520 disposed in parallel with the operation shaft 160; a drive-side operation gear 530 supported by the operation transmission shaft 520 so as to be incapable of relative rotation; a driven-side operation gear 540 supported by the operation shaft 160 so as to be incapable of relative rotation and meshed with the drive-side operation gear 530; and an operation arm 510, the proximal part of which is supported by the operation transmission shaft 520 so as to be incapable of relative rotation.

In this embodiment, the number of teeth is set such that the drive-side operation gear 530 and the driven-side operation gear 540 form a multiplying gear train, and, accordingly, the amount of rotation of the operation shaft 160 around the axis is larger than the amount of rotation of the operation transmission shaft 520 around the axis resulting from manual operation.

The shift-drum speed change mechanism 100 of this embodiment is configured to be capable of providing four speed change states.

Specifically, as shown in FIGS. 1 and 2, the shift-drum speed change mechanism 100 further comprises third and fourth speed change members 120(3) and 120(4) relatively rotatable around the axis relative to the power transmission rotating shaft 110; a second slider 130(2) supported by the power transmission rotating shaft 110 so as to be incapable of relative rotation around the axis and movable in the axial direction between the third and fourth speed change members 120(3) and 120(4); a second shift fork 150(2) supported by the fork shaft 140 so as to be movable in the axial direction; and a second drum 170(2) supported by the operation shaft 160 so as to be incapable of relative rotation around the axis and movable in the axial direction.

As shown in FIG. 1, in this embodiment, the power transmission rotating shaft 110 is a speed-change driven shaft placed on the downstream side in the direction of power transmission.

That is, the shift-drum speed change mechanism 100 of this embodiment comprises a speed-change drive shaft 105 which is provided in parallel with the power transmission rotating shaft 110 and to which rotative power is operatively transferred from the engine 20 as shown in FIG. 1, and is configured to cause the power transmission rotating shaft 110 acting as the speed-change driven shaft to be capable of providing rotational speeds corresponding to the first to fourth speed change members 120(1) to 120(4) in accordance with manual operation on the operation shaft 160.

Specifically, as shown in FIG. 1, drive-side first to third speed change gears 106(1) to 106(3) are supported by the speed-change drive shaft 105 so as to be incapable of relative rotation.

Correspondingly, the first to third speed change members 120(1) to 120(3) are driven-side first to third speed change gears supported so as to be relatively rotatable by the power transmission rotating shaft 110 acting as the speed-change driven shaft.

That is, the first speed change member 120(1) is directly meshed with the drive-side first speed change gear 106(1) and forms a forward high-speed gear train together with the drive-side first speed change gear 106(1).

The second speed change member 120(2) is connected to the drive-side second speed change gear 106(2) via an idle gear 107 and forms a reverse gear train together with the drive-side second speed change gear 106(2).

The third speed change member 120(3) is directly meshed with the drive-side third speed change gear 106(3) and forms a forward low-speed gear train together with the drive-side third speed change gear 106(3).

In this embodiment, the fourth speed change member 120(4) is a fixed member fixed so as to be unrotatable as shown in FIG. 1.

That is, the shift-drum speed change mechanism 100 of this embodiment is configured to provide a state where the rotation of the power transmission rotating shaft 110 is forcedly suspended as a fourth speed change state.

The end face of the first slider 130(1) on one side in the axial direction facing the first speed change member 120(1) has a depression/projection engagement part 131(1) for the first speed change member (see, for example, FIG. 3 below), and the end face on the other side in the axial direction facing the second speed change member 120(2) has a depression/projection engagement part 131(2) for the second speed change member (see FIG. 2).

The first speed change member 120(1) has a depression/projection engagement part 121(1) corresponding to the depression/projection engagement part 131(1) for the first speed change member (see, for example, FIG. 3 below), and the second speed change member 120(2) has a depression/projection engagement part 121(2) corresponding to the depression/projection engagement part 131(2) for the second speed change member (see FIG. 2).

Figure 4:
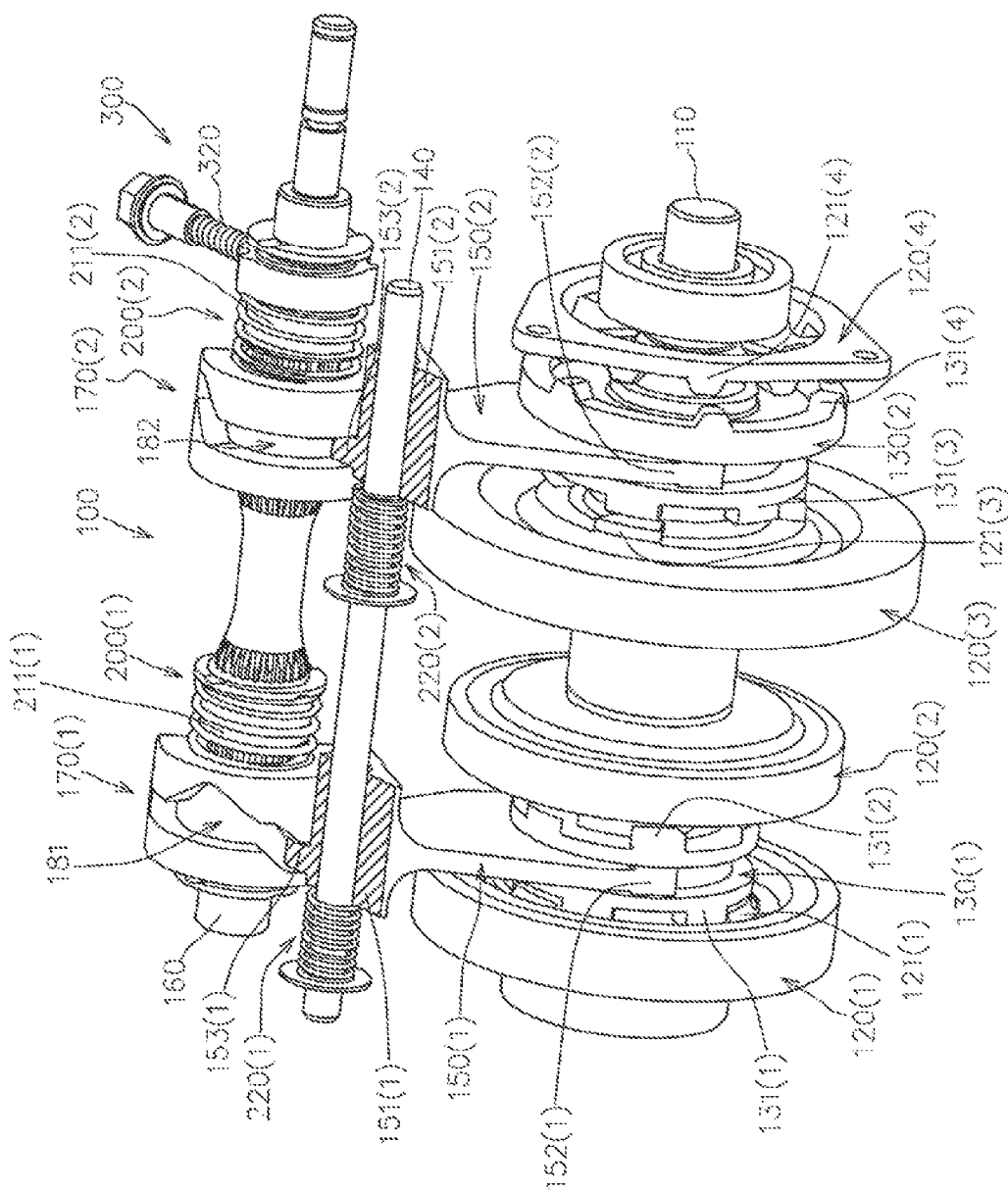
FIG. 4 is a partial vertical cross-sectional perspective view of the shift-drum speed change mechanism in a first speed change state.
Figure 5:
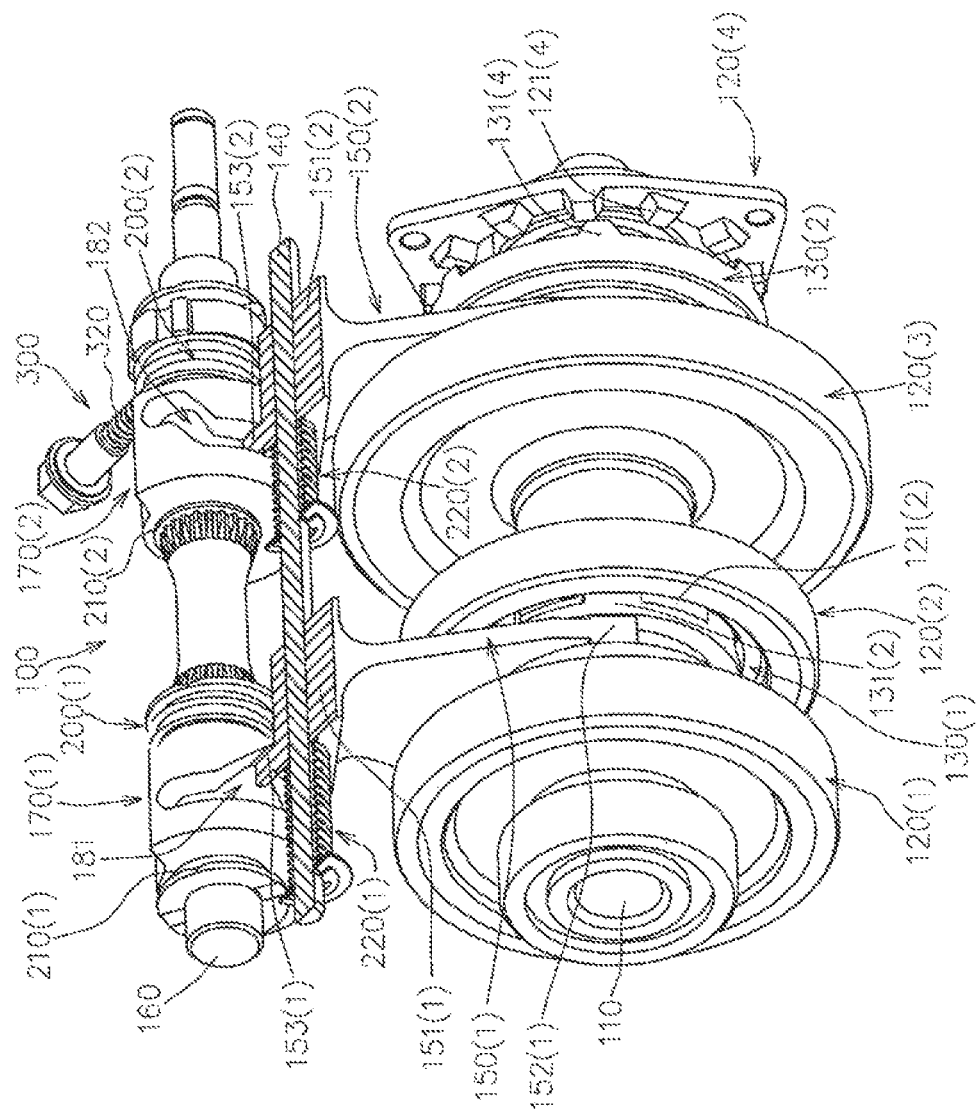
FIG. 5 is a partial vertical cross-sectional perspective view of the shift-drum speed change mechanism in a second speed change state.

With respect to the axial direction, the first slider 130(1) is capable of selectively taking a first speed change position where the depression/projection engagement part 131(1) for the first speed change member is engaged with the depression/projection engagement part 121(1) of the first speed change member 120(1) (see FIG. 4 below), a neutral position where the first slider 130(1) does not engaged with any of the first and second speed change members 120(1) and 120(2) (see, for example, FIG. 3 below), and a second speed change position where the depression/projection engagement part 131(2) for the second speed change member is engaged with the depression/projection engagement part 121(2) of the second speed change member 120(2) (see FIG. 5 below).

That is, the neutral position of the first slider 130(1) where the first slider 130(1) is not engaged with any of the first and second speed change members means a reference position in the axial direction (non-engagement position) of the first slider 130(1), the first speed change position means a first displaced position where the first slider 130(1) is displaced a predetermined distance from the reference position toward one side in the axial direction so as to be come close to the first speed change member, and the second speed change position means a second displaced position where the first slider 130(1) is displaced a predetermined distance from the reference position toward the other side in the axial direction so as to be come close to the second speed change member.

Likewise, the end face of the second slider 130(2) on one side in the axial direction facing the third speed change member 120(3) has a depression/projection engagement part 131(3) for the third speed change member (see, for example, FIG. 3 below), and the end face on the other side in the axial direction facing the fourth speed change member 120(4) has a depression/projection engagement part 131(4) for the fourth speed change member (see FIG. 2).

The third speed change member 120(3) has a depression/projection engagement part 121(3) corresponding to the depression/projection engagement part 131(3) for the third speed change member (see, for example, FIG. 3 below), and the fourth speed change member 120(4) has a depression/projection engagement part 121(4) corresponding to the depression/projection engagement part 131(4) for the fourth speed change member (see FIG. 2).

Figure 6:
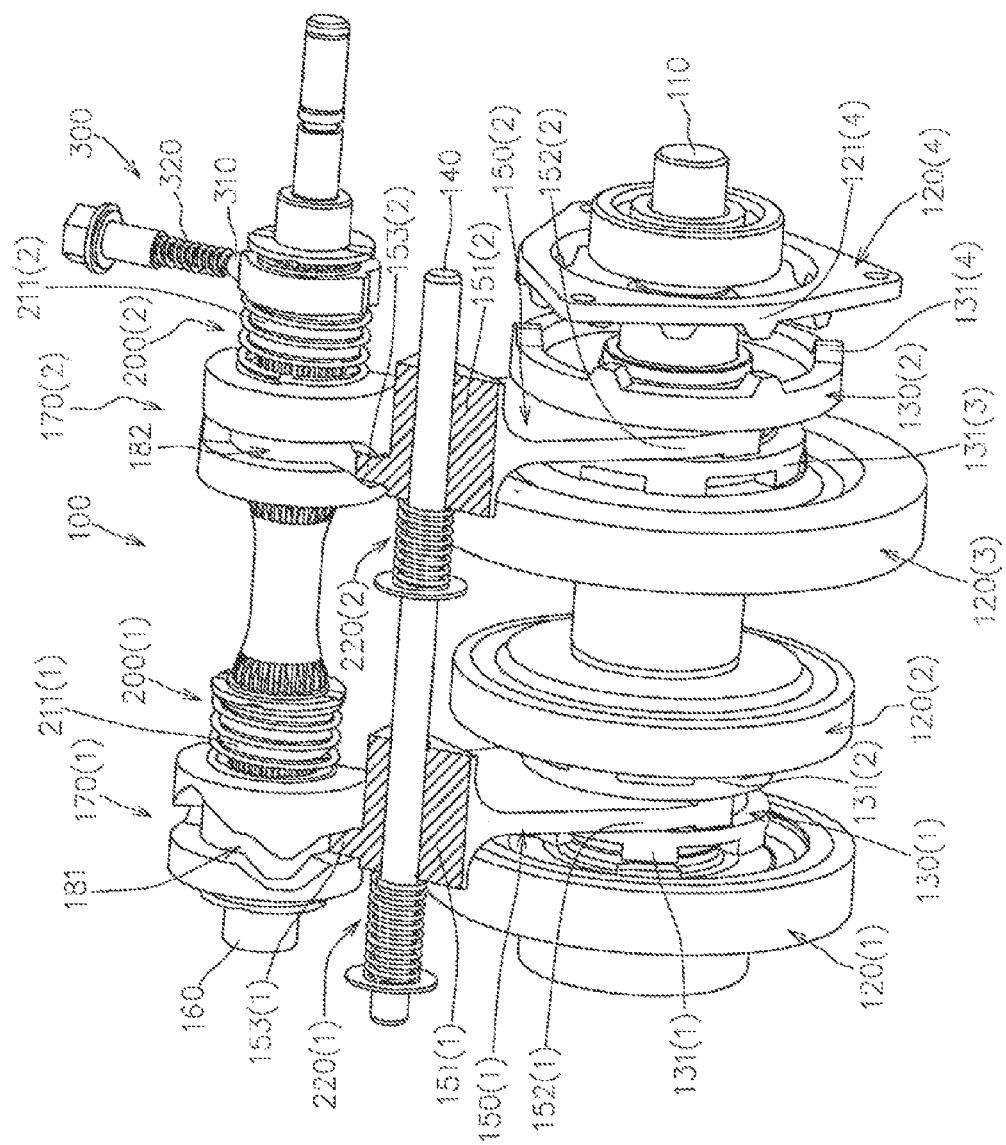
FIG. 6 is a partial vertical cross-sectional perspective view of the shift-drum speed change mechanism in the third speed change state.
Figure 7:
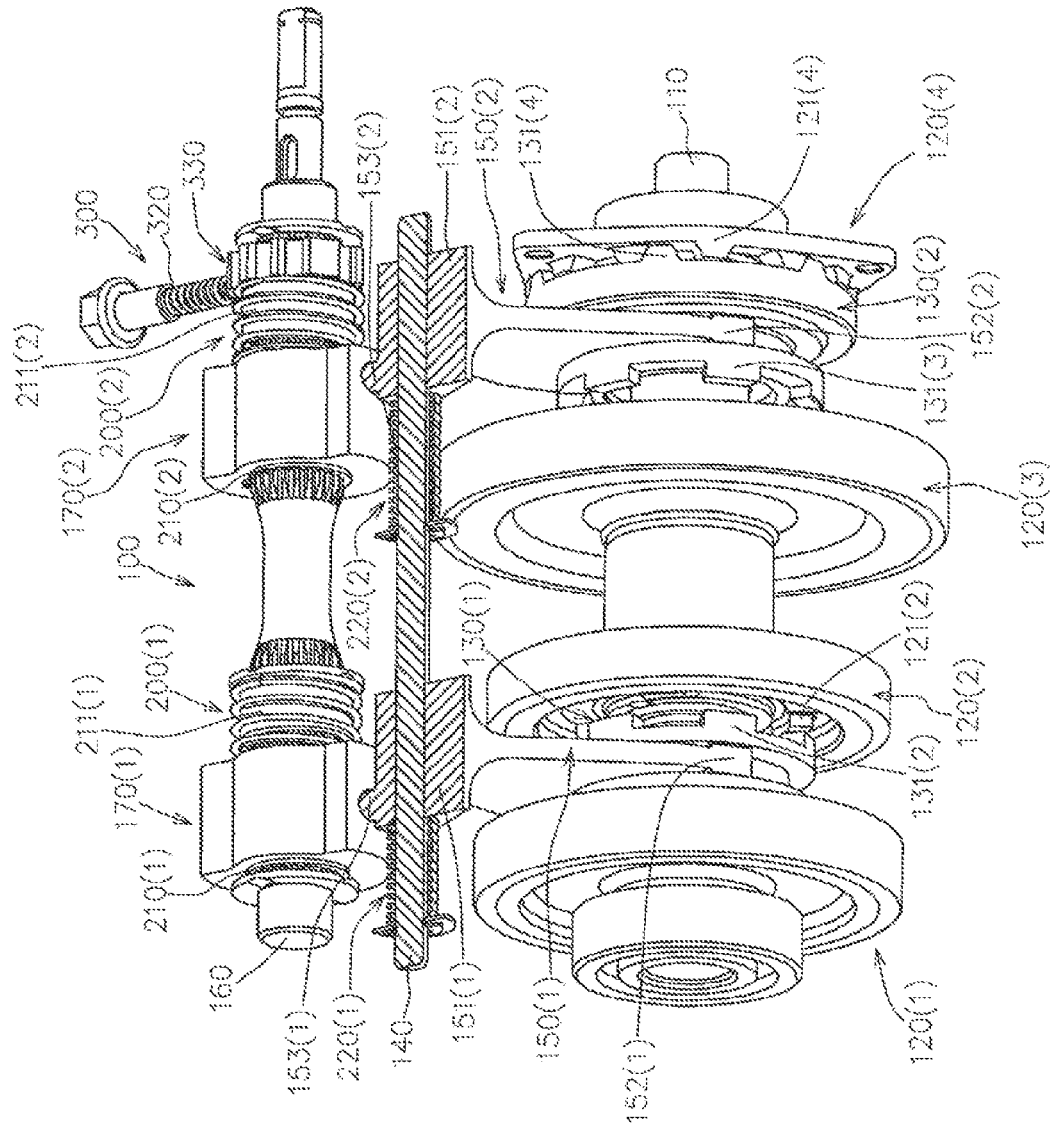
FIG. 7 is a partial vertical cross-sectional perspective view of the shift-drum speed change mechanism in a fourth speed change state.

With respect to the axial direction, the second slider 130(2) is capable of selectively taking a third speed change position where the depression/projection engagement part 131(3) for the third speed change member is engaged with the depression/projection engagement part 121(3) of the third speed change member 120(3) (see FIG. 6 below), a neutral position where the second slider 130(2) is not engaged with any of the third and fourth speed change members 120(3) and 120(4) (see, for example, FIG. 3 below), and a fourth speed change position where the depression/projection engagement part 131(4) for the fourth speed change member is engaged with the depression/projection engagement part 121(4) of the fourth speed change member 120(4) (see FIG. 7 below).

That is, the neutral position of the second slider means a reference position in the axial direction (non-engagement position) where the second slider 130(2) is not engaged with any of the third and fourth speed change members means, the third speed change position means a first displaced position where the second slider 130(2) is displaced a predetermined distance from the reference position toward one side in the axial direction so as to be come close to the third speed change member, and the fourth speed change position means a second displaced position where the second slider 130(2) is displaced a predetermined distance from the reference position toward the other side in the axial direction so as to be come close to the fourth speed change member.

In the shift-drum speed change mechanism 100, the speed change states are changed in accordance with the positions of the first and second sliders 130(1) and 130(2) in the axial direction.

That is, when the first and second sliders 130(1) and 130(2) are both placed at the neutral position (the reference position), a neutral state is provided where the power transmission rotating shaft 110 is rotatable around the axis.

Figure 3:
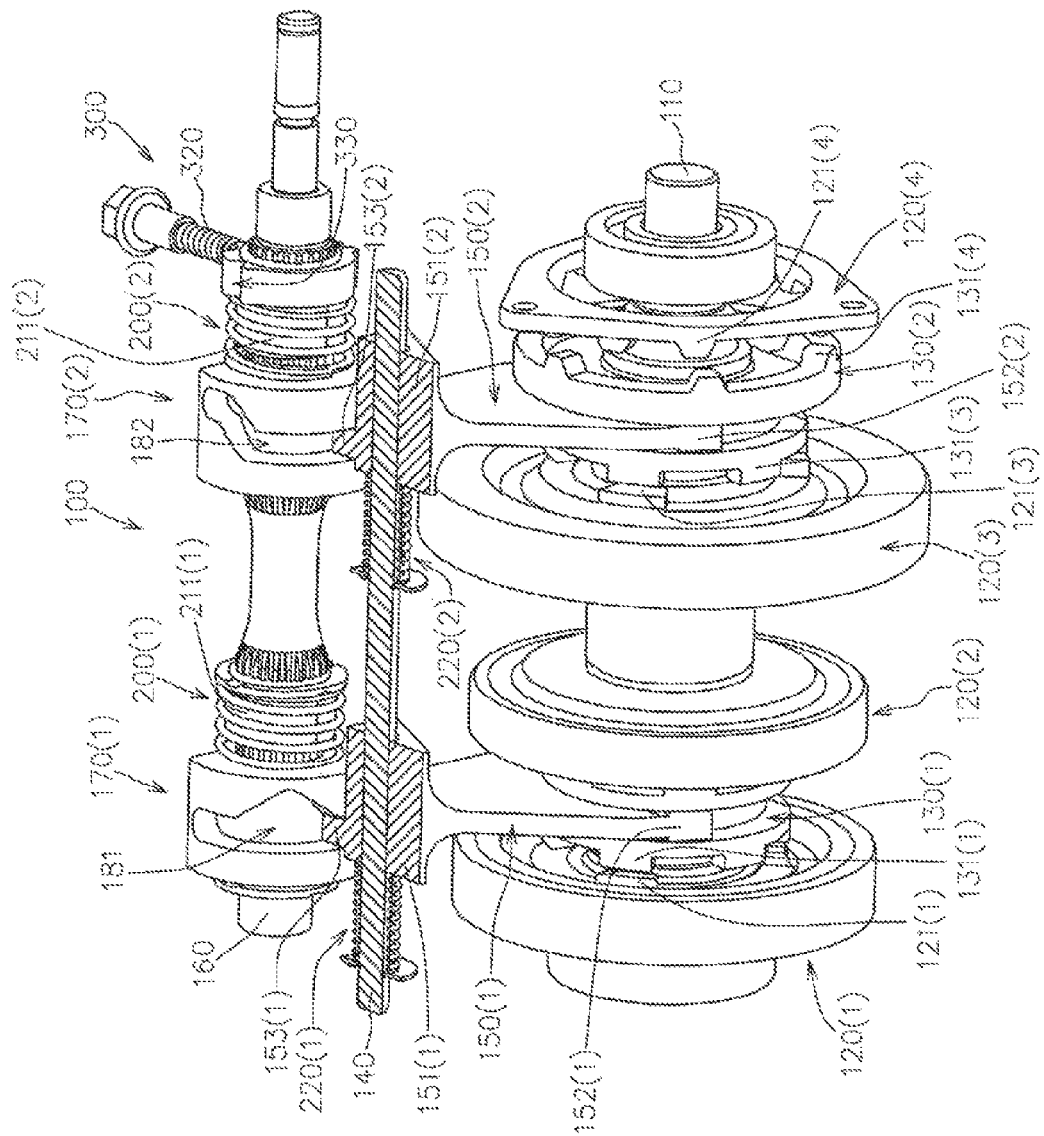
FIG. 3 is a partial cross-sectional perspective view of the shift-drum speed change mechanism in a neutral state.

FIG. 3 shows a partial cross-sectional perspective view of the shift-drum speed change mechanism 100 in the neutral state.

The operation unit 500 is not depicted in FIG. 3.

When the first slider 130(1) is placed at the first speed change position (the first displaced position on one side in the axial direction) while the second slider 130(2) is placed at the neutral position (the reference position), the first speed change state is provided where the power transmission rotating shaft 110 is connected to the first speed change member 120(1).

FIG. 4 shows a partial vertical cross-sectional perspective view of the shift-drum speed change mechanism 100 in the first speed change state.

The operation unit 500 is not depicted in FIG. 4.

In this embodiment, as described above, the first speed change member 120(1) forms a forward high-speed gear train, and the first speed change state is a forward high-speed state.

When the first slider 130(1) is placed at the second speed change position (the second displaced position on the other side in the axial direction) while the second slider 130(2) is placed at the neutral position (the reference position), the second speed change state is provided where the power transmission rotating shaft 110 is connected to the second speed change member 120(2).

FIG. 5 shows a partial vertical cross-sectional perspective view of the shift-drum speed change mechanism 100 in the second speed change state.

The operation unit 500 is not depicted in FIG. 5.

In this embodiment, as described above, the second speed change member 120(2) forms a reverse gear train, and the second speed change state is a reverse state.

When the second slider 130(2) is placed at the third speed change position (the first displaced position on one side in the axial direction) while the first slider 130(1) is placed at the neutral position (the reference position), the third speed change state is provided where the power transmission rotating shaft 110 is connected to the third speed change member 120(3).

FIG. 6 shows a partial vertical cross-sectional perspective view of the shift-drum speed change mechanism 100 in the third speed change state.

The operation unit 500 is not depicted in FIG. 6.

In this embodiment, as described above, the third speed change member 120(3) forms a forward low-speed gear train, and the third speed change state is a forward low-speed state.

When the second slider 130(2) is placed at the fourth speed change position (the second displaced position on the other side in the axial direction) while the first slider 130(1) is placed at the neutral position (the reference position), the fourth speed change state is provided where the power transmission rotating shaft 110 is connected to the fourth speed change member 120(4).

FIG. 7 shows a partial vertical cross-sectional perspective view of the shift-drum speed change mechanism 100 in the fourth speed change state.

The operation unit 500 is not depicted in FIG. 7.

In this embodiment, the fourth speed change member 120(4) is configured as a fixed component as described above, and, accordingly, the fourth speed change state is a parking state where the power from the engine 20 is not transmitted to the power transmission rotating shaft 110, and the rotation of the power transmission rotating shaft 110 around the axis is forcibly suspended.

The first and second sliders 130(1) and 130(2) are moved in the axial direction by the first and second shift forks 150(1) and 150(2), respectively.

Figure 8:
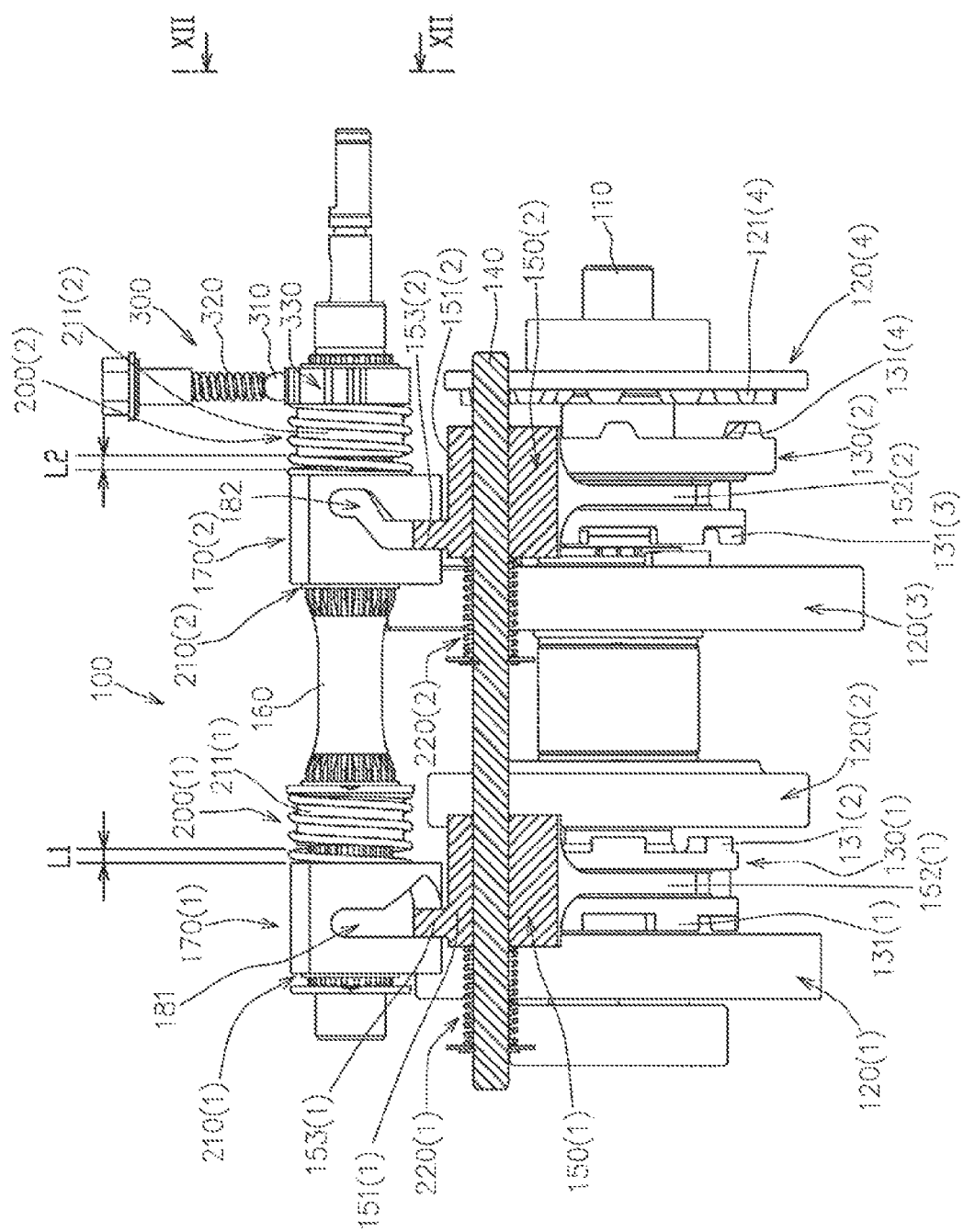
FIG. 8 is a partial vertical cross-sectional front view of the shift-drum speed change mechanism in the neutral state.

FIG. 8 shows a partial vertical cross-sectional front view of the shift-drum speed change mechanism 100 in the neutral state.

As shown in FIGS. 2 to 8, the first shift fork 150(1) has a proximal part 151(1) supported by the fork shaft 140 so as to be movable in the axial direction, a first slider engagement part 152(1) engaged with the first slider 130(1), and a first engagement pin 153(1) inserted in a first guide groove 181 formed in the first drum 170(1).

Likewise, the second shift fork 150(2) has a proximal part 151(2) supported by the fork shaft 140 so as to be movable in the axial direction, a second slider engagement part 152(2) engaged with the second slider 130(2), and a second engagement pin 153(2) inserted in a second guide groove 182 formed in the second drum 170(2).

The first and second guide grooves 181 and 182 are configured to respectively move the first and second shift forks 150(1) and 150(2) in the axial direction relative to the corresponding first and second drums 170(1) and 170(2) in accordance with the position of the operation shaft 160 around the axis.

The configurations of the first and second guide grooves 181 and 182 will be described in detail later.

The shift-drum speed change mechanism 100 of this embodiment further comprises drum springs biasing, toward the first side in the axial direction, the drums supported by the operation shaft 160 so as to be incapable of relative rotation around the axis and movable in the axial direction; fork springs biasing the shift forks toward the second side in the axial direction, which is a side opposite to the first side in the axial direction, with a weaker biasing force than the drum springs; and first stopper members defining the ends of the movement of the drums toward the first side in the axial direction.

As described above, the shift-drum speed change mechanism 100 of this embodiment has the first and second drums 170(1) and 170(2) as the aforementioned drums and the first and second shift forks 150(1) and 150(2) as the aforementioned shift forks.

Accordingly, as shown in FIGS. 2 to 8, the shift-drum speed change mechanism 100 has a first drum spring 200(1) biasing the first drum 170(1) toward the first side in the axial direction and a second drum spring 200(2) biasing the second drum 170(2) toward the first side in the axial direction as the aforementioned drum springs; a first fork spring 220(1) biasing the first shift fork 150(1) toward the second side in the axial direction with a weaker biasing force than the first drum spring 200(1) and a second fork spring 220(2) biasing the second shift fork 150(2) toward the second side in the axial direction with a weaker biasing force than the second drum spring 200(2) as the aforementioned fork springs; and a first stopper member 210(1) for the first drum, defining the end of the movement of the first drum 170(1) toward the first side in the axial direction, and a first stopper member 210(2) for the second drum, defining the end of the movement of the second drum 170(2) toward the first side in the axial direction as the aforementioned first stopper members.

The shift-drum speed change mechanism 100 of this embodiment comprises a detent mechanism 300, which will be described later, for locking the operation shaft 160 at respective operational positions or respective speed change positions and is configured such that the biasing force of the detent mechanism 300 exerts substantially the same action as the second fork spring 220(2).

This configuration can make the second fork spring 220(2) unnecessary.

In this embodiment, the second fork spring 220(2) is provided for backup or assisting purposes.

The detent mechanism 300 will be described in detail later.

In this embodiment, the first side in the axial direction refers to the side on which the first and second sliders 130(1) and 130(2) come close to the first and third speed change members 120(1) and 120(3), respectively, and the second side in the axial direction refers to the side on which the first and second sliders 130(1) and 130(2) come close to the second and fourth speed change members 120(2) and 120(4), respectively.

In this way, in the shift-drum speed change mechanism 100 of this embodiment, an assembly of the first drum 170(1) and the first shift fork 150(1) obtained by inserting the first engagement pin 153(1) into the first guide groove 181 is biased toward the first side in the axial direction by the first drum spring 200(1) and is biased toward the second side in the axial direction by the first fork spring 220(1).

According to this configuration, even in the case where the circumferential position of the depression/projection engagement part 121(1) of the first speed change member 120(1) does not match the circumferential position of the depression/projection engagement part 131(1) of the first slider 130(1) intended for the first speed change member, thus making it impossible to move the first slider 130(1) to the first speed change position (the first displaced position on one side in the axial direction), when operating the operation shaft 160 from the neutral position to the first speed change position around the axis, and even in the case where the position of the depression/projection engagement part 121(2) of the second speed change member 120(2) does not circumferentially match the position of the depression/projection engagement part 131(2) of the first slider 130(1) intended for the second speed change member, thus making it impossible to move the first slider 130(1) to the second speed change position (the second displaced position on the other side in the axial direction), when operating the operation shaft 160 from the neutral position to the second speed change position around the axis, the desired speed change state can be achieved even by applying a manual operating force to the operation shaft 160 until the operating shaft 160 is rotated to a place as far as possible around the axis toward a desired speed change position (the first speed change position or the second speed change position) and then removing the manual operating force applied to the operation shaft 160.

Regarding this point, the case where the operation shaft 160 is operated from the neutral position to the first speed change position around the axis will now be described first.

Figure 9:
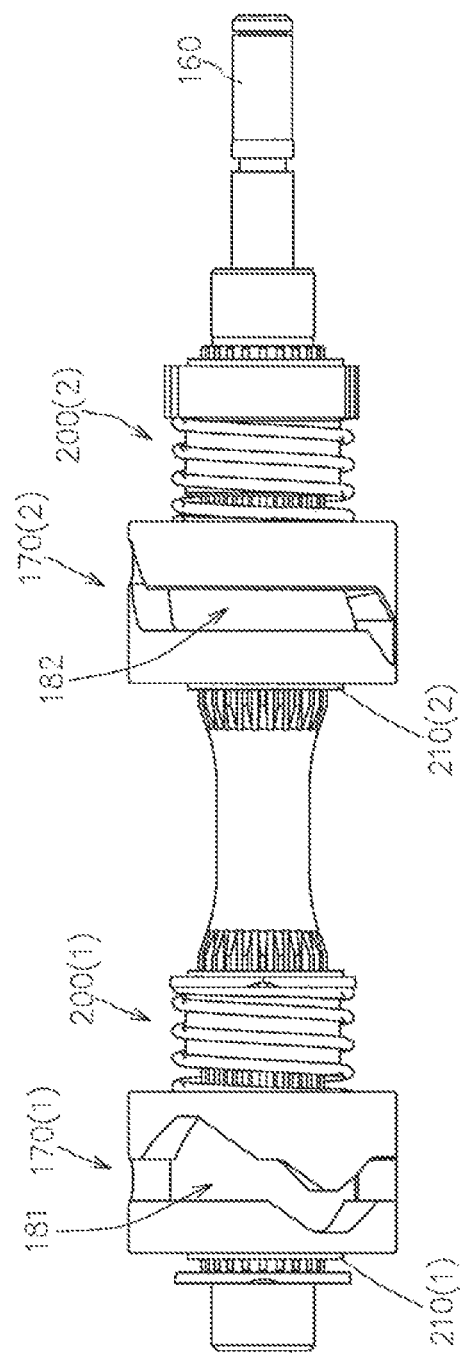
FIG. 9 is a bottom view of an operation shaft assembly including an operation shaft, first and second drums, first and second drum springs, and first and second stoppers in the shift-drum speed change mechanism.

FIG. 9 shows an underside view of an operation shaft assembly including the operation shaft 160, the first and second drums 170(1) and 170(2), the first and second drum springs 200(1) and 200(2), and the first and second stoppers 210(1) and 210(2).

Figure 10:
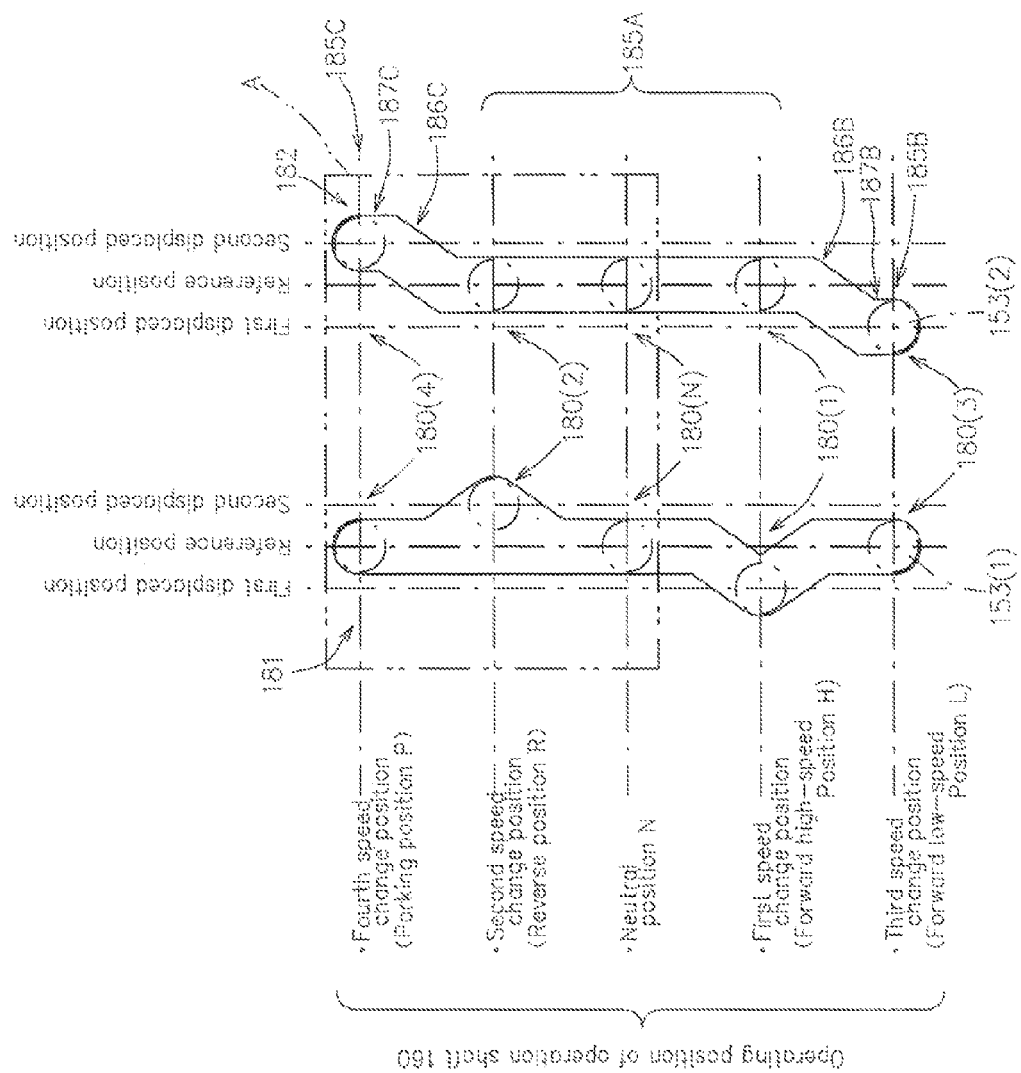
FIG. 10 is an exploded view of first and second guide grooves provided in the first and second drums.

FIG. 10 shows an exploded view of the first and second guide grooves 181 and 182.

As shown in FIGS. 9 and 10, in this embodiment, the first guide groove 181 is formed such that the first engagement pin 153(1) is pressed toward the first side in the axial direction due to the rotational operation of the operation shaft 160 from the neutral position to the first speed change position around the axis.

Accordingly, the first slider 130(1) is pressed to the first side in the axial direction toward the first speed change member 120(1) due to the rotational operation of the operation shaft 160 from the neutral position to the first speed change position around the axis.

At this time, if the circumferential position of the depression/projection engagement part 121(1) of the first speed change member 120(1) does not match the circumferential position of the depression/projection engagement part 131(1) of the first slider 130(1) intended for the first speed change member, the depression-projection engagement parts collide with each other, and the first slider 130(1) cannot move to the first speed change position on the first side in the axial direction (the first displaced position on one side in the axial direction).

In this state, if the operation shaft 160 is further operated toward the first speed change position around the axis, the first engagement pin 153(1) is pressed by the first guide groove 181 toward the second side in the axial direction, and the first drum 170(1) moves toward the second side in the axial direction while compressing the first drum spring 200(1).

This state is a first speed change waiting state in which the first slider 130(1) is biased toward the first speed change member 120(1) by the biasing force retained in the first drum spring 200(1).

Therefore, when the circumferential positions of the depression/projection engagement part 121(1) of the first speed change member 120(1) and the depression/projection engagement part 131(1) for the first speed change member match, the first drum 170(1), the first shift fork 150(1), and the first slider 130(1) are pushed toward the first side in the axial direction until the first speed change position (the first displaced position on one side in the axial direction) is reached where the first slider 130(1) is projection/depression-engaged with the first speed change member 120(1) by the biasing force retained in the first drum spring 200(1), and the first speed change state is thus provided.

Next, the case where the operation shaft 160 is operated from the neutral position to the second speed change position around the axis will now be described.

As shown in FIGS. 9 and 10, in this embodiment, the first guide groove 181 is formed such that the first engagement pin 153(1) is not pressed in the axial direction by the rotational operation of the operation shaft 160 from the neutral position to the second speed change position around the axis, and when the operation shaft 160 is at the second speed change position, the first shift fork 150(1) is allowed to relatively move relative to the first drum 170(1) between the reference position and the second displaced position where the shift fork is displaced from the reference position toward the second side in the axial direction.

Therefore, even when the circumferential position of the depression/projection engagement part 121(2) of the second speed change member 120(2) does not match the circumferential position of the depression/projection engagement part 131(2) of the first slider 130(1) intended for the second speed change member at the time of operating the operation shaft 160 from the neutral position to the second speed change position around the axis, the operation shaft can be placed freely at the second speed change position around the axis irrespective of the positions of the first shift fork 150(1) and the first slider 130(1) in the axial direction.

This state, i.e., a state where the first slider 130(1) cannot be moved to the second speed change position (the second displaced position on the other side in the axial direction) due to the interference between the depression/projection engagement part 121(2) of the second speed change member 120(2) and the depression/projection engagement part 131(2) for the second speed change member and only the operation shaft 160 is placed at the second speed change position around the axis, is a second speed change waiting state where the first engagement pin 153(1) is not restricted by the first guide groove 181, and the first shift fork 150(1) can be moved from the reference position to the second displaced position due to the biasing force of the first fork spring 220(1).

Therefore, when the circumferential positions of the depression/projection engagement part 121(2) of the second speed change member 120(2) and the depression/projection engagement part 131(2) for the second speed change member match, the first shift fork 150(1) and the first slider 130(1) are pushed toward the second side in the axial direction until the second speed change position (the second displaced position on the other side in the axial direction) is reached where the first slider 130(1) is projection/depression-engaged with the second speed change member 120(2) by the biasing force retained in the first fork spring 220(1), and the second speed change state is thus provided.

It is also possible to modify the first guide groove 181 such that the first engagement pin 153(1) is pressed toward the second side in the axial direction by the first guide groove 181 in accordance with the rotational operation of the operation shaft 160 from the neutral position to the second speed change position around the axis (not shown).

In this modification, in the case where the first slider 130(1) cannot be moved to the second speed change position (the second displaced position on the other side in the axial direction) because the circumferential positions of the depression/projection engagement part 121(2) of the second speed change member 120(2) and the depression/projection engagement part 131(2) for the second speed change member do not match when the operation shaft 160 is operated from the neutral position to the second speed change position around the axis, a state is provided where the operation shaft 160 is placed at an intermediate position between the neutral position and the second speed change position around the axis.

When the circumferential positions of the depression/projection engagement part 121(2) of the second speed change member 120(2) and the depression/projection engagement part 131(2) for the second speed change member match, the first shift fork 150(1) and the first slider 130(1) are pushed toward the second side in the axial direction until the first slider 130(1) is placed at the second speed change position (the second displaced position on the other side in the axial direction) where the first slider 130(1) is projection/depression-engaged with the second speed change member 120(2) by the biasing force of the first fork spring 220(1), and the second speed change state is thus provided.

At this time, the operation shaft 160 is rotated around the axis to the second speed change position by the cam action of the modified first guide groove and the first engagement pin 153(1).

Thus, in this embodiment, when attempting to operate the operation shaft 160 to a desired speed change position around the axis, merely applying the manual operating force to the operation shaft 160 until the operation shaft 160 is rotated as far as possible around the axis irrespective of whether the first slider 130(1) is immediately depression/projection-engaged with the corresponding first or second speed change member 120(1) or 120(2) and then removing the manual operating force to the operation shaft 160 can provide the desired speed change state due to the biasing force of the first drum spring 200(1) or the first fork spring 220(1).

Furthermore, the shift-drum speed change mechanism 100 of this embodiment is configured such that the first drum 170(1) is biased toward the first side in the axial direction by the first drum spring 200(1), the first shift fork 150(1) is biased toward the second side in the axial direction by the first fork spring 220(1), the biasing force of the first drum spring 200(1) is greater than the biasing force of the first fork spring 220(1), and the end of the movement of the first drum 170(1) toward the first side in the axial direction is defined by the first stopper member 210(1) for the first drum.

This configuration makes it possible to precisely place the first slider 130(1) at the neutral position (the reference position) while attaining the speed change waiting states (the first speed change waiting state and the second speed change waiting state) of the first slider 130(1) waiting to be moved toward the respective sides in the axial direction.

That is, theoretically, the speed change waiting states of the first slider 130(1) waiting to be moved to the respective sides in the axial direction can be attained also by a configuration in which a pair of drum springs having the same biasing force are disposed on the respective sides of the first drum 170(1) in the axial direction (hereinafter a comparative example).

However, in the comparative example, the neutral position (the reference position) of the first drum 170(1) (as well as the first shift fork 150(1) and the first slider 130(1)) is defined by the balance between the biasing forces of the pair of drum springs, and it is thus difficult to precisely place the first slider 130(1) at the neutral position (the reference position) and stably retain the first slider 130(1) at the neutral position (the reference position).

On the other hand, in the configuration of this embodiment, the biasing force of the first drum spring 200(1) is greater than the biasing force of the first fork spring 220(1), and, in a state where no external force is applied, the first drum 170(1) is retained at the axial position (the initial position) defined by the first stopper member 210(1) for the first drum.

Accordingly, regulating the position of the first engagement pin 150(1) in the axial direction by the first guide groove 181 makes it possible to precisely place and stably retain the first shift fork 150(1) and the first slider 130(1) at the neutral position (the reference position).

The shift-drum speed change mechanism 100 of this embodiment has the configuration described below for the following purposes: the first speed change waiting state is effectively provided when the operation shaft 160 is operated from the neutral position or the third speed change position to the first speed change position, and the first slider 130(1) is moved from the second speed change position toward the first side in the axial direction by operating the operation shaft 160 so as to be able to reliably release the depression/projection engagement part 131(2) for the second speed change member from the depression/projection engagement part 121(2) even when there is torque containment between the depression/projection engagement part 121(2) of the second speed change member 120(2) and the depression/projection engagement part 131(2) of the first slider 130(1) for the second speed change member at the time of transfer from the second speed change state to the neutral state or to the fourth speed change state (i.e., at the time of operating the operation shaft 160 from the second speed change position to the neutral position or to the fourth speed change position).

Specifically, as shown in, for example, FIG. 8, the shift-drum speed change mechanism 100 of this embodiment has a second stopper member 211(1) for the first drum, defining the end of the movement of the first drum 170(1) toward the second side in the axial direction.

As shown in FIG. 8, the second stopper member 211(1) for the first drum is disposed such that, in a state where the first drum 170(1) is in contact with the first stopper member 210(1) for the first drum, there is a gap having a predetermined distance L1 between the stopper member 211(1) and the surface of the first drum 170(1) facing the stopper member 211(1) (i.e., the end face of the first drum 170(1) facing the second side in the axial direction).

The second stopper member 211(1) for the first drum exerts the following actions.

That is, when the operation shaft 160 is operated from the second speed change position to the neutral position or to the fourth speed change position in order to transfer from the second speed change state to the neutral state or to the fourth speed change state, a pressing force toward the first side in the axial direction acts on the first engagement pin 153(1) due to the cam action resulting from the inclined surface of the first guide groove 181 connected to a second-speed-change engagement part 180(2).

In a normal state (a state where there is no torque containment between the depression/projection engagement part 131(2) for the second speed change member and the depression/projection engagement part 121(2)), the first shift fork 150(1) and the first slider 130(1) are moved toward the first side in the axial direction due to the pressing force so that the engagement of the depression/projection engagement part 131(2) for the second speed change member and the depression/projection engagement part 121(2) is released.

However, when there is torque containment between the depression/projection engagement part 131(2) for the second speed change member and the depression/projection engagement part 121(2), the first shift fork 150(1) and the first slider 130(1) cannot move in the axial direction. Therefore, when the first drum 170(1) is rotated around the axis in accordance with the operation of the operation shaft 160 from the second speed change position to the neutral position or to the fourth speed change position, the first drum 170(1) is moved toward the second side in the axial direction against the biasing force of the first drum spring 200(1) due to the cam action of the inclined surface of the first guide groove 181 connected to the second-speed-change engagement part 180(2).

At this time, the second stopper member 211(1) for the first drum prevents the first drum 170(1) from moving toward the second side in the axial direction, and, accordingly, a thrust is applied to the first engagement pin 153 due to the cam action of the inclined surface of the first guide groove 181 in accordance with the operation of the operation shaft 160 from the second speed change position to the neutral position or to the fourth speed change position so that the first shift fork 150(1) and the first slider 130(1) are moved toward the first side in the axial direction.

The predetermined distance L1 is set such that the engagement pin 153(1) is still in engagement with the inclined surface of the first guide groove 181 connected to the second-speed-change engagement part 180(2) when the first drum 170(1) is moved toward the second side in the axial direction and brought into contact with the second stopper member 211(1) for the first drum due to the aforementioned torque containment when the operation shaft 160 is operated from the second speed change position toward the neutral position or to the fourth speed change position.

As shown in FIG. 8, the shift-drum speed change mechanism 100 of this embodiment also has a second stopper member 211(2) for the second drum, defining the end of the movement of the second drum 170(2) toward the second side in the axial direction.

As shown in FIG. 8, the second stopper member 211(2) for the second drum is disposed such that, in a state where the second drum 170(2) is in contact with the first stopper member 210(2) for the second drum, there is a gap having a predetermined distance L2 between the stopper member 211(2) and the surface of the second drum 170(2) facing the stopper member 211(2) (i.e., the end face of the second drum 170(2) facing the second side in the axial direction).

The second stopper member 211(2) for the second drum exerts the same action on the second drum 170(2) as the action of the second stopper member 211(1) for the first drum on the first drum 170 (1).

The predetermined distance L2 is set such that the engagement pin is in engagement with the inclined surface of the second guide groove 182 connected to a fourth-speed-change engagement part 180(4) when the second drum is moved toward the second side in the axial direction and brought into contact with the second stopper member for the second drum due to torque containment when the operation shaft is operated from the fourth speed change position toward the neutral position.

As shown in FIG. 8, in this embodiment, the second stopper member 211(1) for the first drum is disposed around the operation shaft 160 and radially inside the first drum spring 200(1), and the second stopper member 211(2) for the second drum is disposed around the operation shaft 160 and radially inside the second drum spring 200(2).

The configurations of the first and second guide grooves 181 and 182 will now be described in detail.

The first and second guide grooves 181 and 182 are formed such that a first speed change state (a forward high-speed state), a second speed change state (a reverse state), a neutral state, a third speed change state (a forward low-speed state), and a fourth speed change state (a parking state) can be selectively provided in accordance with the operational position or the speed change position of the single operation shaft 160 around the axis.

Specifically, the operation shaft 160 is configured to be able to take around the axis a neutral position N, a first speed change position reached when the operation shaft 160 is rotated from the neutral position N toward one side around the axis (a forward high-speed position H in this embodiment), a third speed change position reached when the operation shaft 160 is rotated from the first speed change position further toward one side around the axis (a forward low-speed position L in this embodiment), a second speed change position reached when the operation shaft 160 is rotated from the neutral position N toward the other side around the axis (a reverse position R in this embodiment), and a fourth speed change position reached when the operation shaft 160 is rotated from the second speed change position further toward the other side around the axis (a forced no-rotation position or a parking position P in this embodiment).

As shown in FIGS. 9 and 10, the first and second guide grooves 181 and 182 each have a neutral engagement part 180(N), a first-speed-change engagement part 180(1), a second-speed-change engagement part 180(2), a third-speed-change engagement part 180(3), and the fourth-speed-change engagement part 180(4), with which the corresponding engagement pins 153(1) and 153(2) are respectively engaged when the operation shaft 160 is placed at the neutral position N, the first speed change position, the second speed change position, the third speed change position, and the fourth speed change position.

First, the first guide groove 181 will now be described.

The first guide groove 181 regulates the movement of the first engagement pin 153(1) in the axial direction such that the relative position of the first shift fork 150(1) in the axial direction relative to the first drum 170(1) is at the reference position when the operation shaft 160 is placed at such a position around the axis that the first slider 130(1) is placed at a position other than a speed change position (i.e., the first speed change position (the first displaced position on one side in the axial direction) or the second speed change position (the second displaced position on the other side in the axial direction)), i.e., when the operation shaft 160 is placed at the neutral position N, the third speed change position, and the fourth speed change position.

That is, the neutral engagement part 180(N), the third-speed-change engagement part 180(3), and the fourth-speed-change engagement part 180(4) of the first guide groove 181, with which the first engagement pin 153(1) is engaged when the operation shaft 160 is placed at the neutral position N, the third speed change position, and the fourth speed change position, respectively, are engaged with the first engagement pin 153(1) such that the first shift fork 150(1) is retained at the reference position relative to the first drum 170(1).

On the other hand, the first-speed-change engagement part 180(1) of the first guide groove 181 is engaged with the first engagement pin 153(1) such that the first shift fork 150(1) is retained at the first displaced position where the first shift fork 150(1) is displaced from the reference position toward the first side in the axial direction relative to the first drum 170(1).

That is, when the operation shaft 160 is placed at the first speed change position, the relative position of the first shift fork 150(1) in the axial direction relative to the first drum 170(1) is retained at the first displaced position due to the engagement of the first engagement pin 153(1) and the first guide groove 181.

The transitional region between the neutral engagement part 180(N) and the first-speed-change engagement part 180(1) of the first guide groove 181 guides the first engagement pin 153(1) such that the first shift fork 150(1) is relatively moved in the axial direction relative to the first drum 170(1) from the reference position to the first displaced position as the operation shaft 160 is rotated from the neutral position N to the first speed change position, and the first shift fork 150(1) is relatively moved in the axial direction relative to the first drum 170(1) from the first displaced position to the reference position as the operation shaft 160 is rotated from the first speed change position to the neutral position N.

The third-speed-change engagement part 180(3) is disposed on the opposite side of the first-speed-change engagement part 180(1) from the neutral engagement part 180(N) around the axis, and as described above, is engaged with the first engagement pin 153(1) such that the first shift fork 150(1) is retained at the reference position relative to the first drum 170(1).

The transitional region between the first-speed-change engagement part 180(1) and the third-speed-change engagement part 180(3) of the first guide groove 181 guides the first engagement pin 153(1) such that the first shift fork 150(1) is relatively moved in the axial direction relative to the first drum 170(1) from the first displaced position to the reference position as the operation shaft 160 is rotated from the first speed change position to the third speed change position, and the first shift fork 150(1) is relatively moved in the axial direction relative to the first drum 170(1) from the reference position to the first displaced position as the operation shaft 160 is rotated from the third speed change position to the first speed change position.

On the other hand, the second-speed-change engagement part 180(2) of the first guide groove 181 is engaged with the first engagement pin 153(1) such that the first shift fork 150(1) can be freely moved relative to the first drum 170(1) in the axial direction between the reference position and the second displaced position displaced from the reference position toward the other side in the axial direction.

That is, when the operation shaft 160 is placed at the second speed change position, the relative position of the first shift fork 150(1) in the axial direction relative to the first drum 170(1) is variable between the reference position and the second displaced position.

The transitional region between the neutral engagement part 180(N) and the second-speed-change engagement part 180(2) of the first guide groove 181 is engaged with the first engagement pin 153(1) such that the terminal position of the relative movement of the first shift fork 150(1) toward one side in the axial direction relative to the first drum 170(1) stays at the reference position irrespective of the rotational position of the operation shaft 160, and the terminal position of the relative movement toward the other side in the axial direction is changed from the reference position to the second displaced position in accordance with the rotation of the operation shaft 160 from the neutral position to the second speed change position.

The fourth-speed-change engagement part 180(4) is disposed on the opposite side of the second-speed-change engagement part 180(2) from the neutral engagement part 180(N), and as described above, is engaged with the first engagement pin 153(1) such that the first shift fork 150(1) is retained at the reference position relative to the first drum 170(1).

The transitional region between the second-speed-change engagement part 180(2) and the fourth-speed-change engagement part 180(4) of the first guide groove 181 is engaged with the first engagement pin 153(1) such that the terminal position of the relative movement of the first shift fork 150(1) toward one side in the axial direction relative to the first drum 170(1) stays at the reference position irrespective of the rotational position of the operation shaft 160, and the terminal position of the relative movement toward the other side in the axial direction is changed from the second displaced position to the reference position in accordance with the rotation of the operation shaft 160 from the second speed change position to the fourth speed change position.

Next, the second guide groove 182 will now be described.

The second guide groove 182 is engaged with the second engagement pin 153(2) such that the relative position of the second shift fork 150(2) in the axial direction relative to the second drum 170(2) is at the reference position when the operation shaft 160 is placed at such a position around the axis that the second slider 130(2) is placed at a position other than a speed change position (i.e., the third speed change position (the first displaced position on one side in the axial direction) or the fourth speed change position (the second displaced position on the other side in the axial direction)), i.e., when the operation shaft 160 is placed at the neutral position N, the first speed change position, and the second speed change position.

That is, the neutral engagement part 180(N), the first-speed-change engagement part 180(1), and the second-speed-change engagement part 180(2) of the second guide groove 182, with which the second engagement pin 153(2) is engaged when the operation shaft 160 is placed at the neutral position N, the first speed change position, and the second speed change position, are engaged with the second engagement pin 153(2) such that the second shift fork 150(2) is retained at the reference position relative to the second drum 170(2).

The third-speed-change engagement part 180(3) in the second guide groove 182 is disposed on the opposite side of the first-speed-change engagement part 180(1) from the neutral engagement part 180(N), and is engaged with the second engagement pin 153(2) such that the second shift fork 150(2) is retained at the first displaced position displaced from the reference position toward the first side in the axial direction relative to the second drum 170(2).

That is, when the operation shaft 160 is placed at the third speed change position, the relative position of the second shift fork 150(2) in the axial direction relative to the second drum 170(2) is retained at the first displaced position due to the engagement of the second engagement pin 153(2) and the second guide groove 182.

The transitional region between the first-speed-change engagement part 180(1) and the third-speed-change engagement part 180(3) of the second guide groove 182 guides the second engagement pin 153(2) such that the second shift fork 150(2) is relatively moved in the axial direction relative to the second drum 170(2) from the reference position to the first displaced position as the operation shaft 160 is rotated from the first speed change position to the third speed change position, and the second shift fork 150(2) is relatively moved in the axial direction relative to the second drum 170(2) from the first displaced position to the reference position as the operation shaft 160 is rotated from the third speed change position to the first speed change position.

The fourth-speed-change engagement part 180(4) in the second guide groove 182 is disposed on the opposite side of the second-speed-change engagement part 180(2) from the neutral engagement part 180(N), and is engaged with the second engagement pin 153(2) such that the second shift fork 150(2) is retained at the second displaced position displaced from the reference position toward the second side in the axial direction relative to the second drum 170(2).

That is, when the operation shaft 160 is placed at the fourth speed change position, the relative position of the second shift fork 150(2) in the axial direction relative to the second drum 170(2) is retained at the second displaced position due to the engagement of the second engagement pin 153(2) and the second guide groove 182.

The transitional region between the second-speed-change engagement part 180(2) and the fourth-speed-change engagement part 180(4) of the second guide groove 182 guides the second engagement pin 153(2) such that the second shift fork 150(2) is relatively moved in the axial direction relative to the second drum 170(2) from the reference position to the second displaced position as the operation shaft 160 is rotated from the second speed change position to the fourth speed change position, and the second shift fork 150(2) is relatively moved in the axial direction relative to the second drum 170(2) from the second displaced position to the reference position as the operation shaft 160 is rotated from the fourth speed change position to the second speed change position.

Thus, in this embodiment, the second-speed-change engagement part 180(2) of the first guide groove 181 is configured so as to be engaged with the first engagement pin 153(1) such that the first shift fork 150(1) can be relatively moved in the axial direction between the reference position and the second displaced position relative to the first drum 170(1).

This configuration makes it possible to rotatively operate the operation shaft 160 from the neutral position N to the fourth speed change position via the second speed change position as well as from the fourth speed change position to the neutral position N via the second speed change position without actually placing the first slider 130(1) at the second displaced position.

That is, the first shift fork 150(1) is not subjected to the cam action resulting from the first guide groove 181 and the first engagement pin 153(1) when the operation shaft 160 is rotatively operated from the neutral position N to the fourth speed change position via the second speed change position from a state where the first and second sliders 130(1) and 130(2) are placed at the reference position by the placement of the operation shaft 160 at the neutral position N around the axis.

At this time, the second shift fork 150(2) is subjected to the cam action resulting from the second guide groove 182 and the second engagement pin 153(2), and moved from the reference position to the second displaced position relative to the second drum 170(2).

Accordingly, the speed change operation between the neutral state where the first and second sliders 130(1) and 130(2) are both placed at the reference position and the fourth speed change state where the second slider 130(2) is placed at the fourth speed change position (the second displaced position on the other side in the axial direction) to be connected to the fourth speed change member 120(4) can be performed without actually placing the first slider 130(1) at the second speed change position (the second displaced position on the other side in the axial direction).

In this embodiment, as described above, the first speed change state, the second speed change state, the neutral state, the third speed change state, and the fourth speed change state are a forward high-speed state, a reverse state, a neutral state, a forward low-speed state, and a parking state (forced no-rotation state), respectively.

Therefore, according to the above configuration, it is possible to transfer from the neutral state to the parking state without arriving at the reverse state and transfer from the parking state to the neutral state without arriving at the reverse state.

Thus, in this embodiment, the shift-drum speed change mechanism is configured such that the operation shaft 160 (i.e., the drum member, or the first and second drums 170(1) and 170(2) in this embodiment) is configured to be capable of taking at least a predetermined reference rotational position around the axis (the aforementioned second speed change position or the reverse position in this embodiment), a first-side-around-axis first rotational position (the neutral position N in this embodiment) when rotated predetermined degrees toward one side around the axis from the reference rotational position and a second-side-around-axis first rotational position (the fourth speed change position or the parking position P in this embodiment) when rotated predetermined degrees toward the other side around the axis from the reference rotational position, and when the operation shaft 160 is placed at the reference rotational position, at the first-side-around-axis first rotational position, and at the second-side-around-axis first rotational position, a speed change state resulting from operation to the reference rotational position (the reverse state in this embodiment), a speed change state resulting from operation to the first-side-around-axis first rotational position (the neutral state in this embodiment), and a speed change state resulting from operation to the second-side-around-axis first rotational position (the parking state in this embodiment) are provided, respectively, and with this shift-drum speed change mechanism, it is possible to perform a speed change operation for transition between the speed change state resulting from operation to the first-side-around-axis first rotational position and the speed change state resulting from operation to the second-side-around-axis first rotational position without arriving at the speed change state resulting from operation to the reference rotational position, in addition to a normal speed change operation by which the speed change state resulting from operation to the first-side-around-axis first rotational position and the speed change state resulting from operation to the second-side-around-axis first rotational position are changed to the speed change state resulting from operation to the reference rotational position.

This point will now be described in detail.

As indicated by portion A in FIG. 10, the first guide groove 181 has a groove width that allows the first shift fork 150(1) to be moved in the axial direction between the reference position and the displaced position (the second displaced position in FIG. 10) when the operation shaft 160 (the drum member) is placed at the reference rotational position (the second speed change position or the reverse position R in this embodiment) as well as a groove width that the first shift fork 150(1) is retained at the reference position when the operation shaft 160 (the drum member) is placed at the first-side-around-axis first rotational position adjacent to the reference rotational position (the neutral position N in this embodiment) and when the operation shaft 160 is placed at the second-side-around-axis first rotational position adjacent to the reference rotational position (the fourth speed change position or the parking position P in this embodiment).

Here, as described above, the first shift fork 150(1) is biased by the first fork spring 220(1) toward the second side in the axial direction from the reference position toward the second displaced position.

Accordingly, when the operation shaft 160 (the drum member) is placed at the reference rotational position (the second speed change position or the reverse position R in this embodiment), the first shift fork 150(1) is placed at the displaced position (the second displaced position in FIG. 10) by the biasing force of the first fork spring 220(1).

On the other hand, a portion of the first guide groove 181, with which the first engagement pin 153(1) is engaged when the operation shaft 160 (drum member) is placed at the first-side-around-axis first rotational position (the neutral position N in this embodiment) and when the operation shaft 160 is placed at the second-side-around-axis first rotational position (the fourth speed change position or the parking position P in this embodiment), has such a groove width that the first shift fork 150(1) is retained at the reference position.

Accordingly, when the operation shaft 160 (the drum member) is placed at the first-side-around-axis first rotational position (the neutral position N in this embodiment) and when the operation shaft 160 is placed at the second-side-around-axis first rotational position (the fourth speed change position or the parking position P in this embodiment), the first shift fork 150(1) is retained at the reference position due to the engagement of the first guide groove 181 and the first engagement pin 153(1) against the biasing force of the first fork spring 220(1).

Moreover, the first guide groove 181 has such a groove shape for engagement with the first engagement pin 153(1) that the first shift fork 150(1) is moved toward the reference position against the biasing force of the first fork spring 220(1) as the operation shaft 160 (the drum member) is rotated from the reference rotational position (the second speed change position or the reverse position in this embodiment) to the first-side-around-axis first rotational position (the neutral position N in this embodiment) and to the second-side-around-axis first rotational position (the fourth speed change position or the parking position P in this embodiment).

On the other hand, the second guide groove 182 has such a groove shape for engagement with the second engagement pin 153(2) that when the operation shaft 160 (the drum member) is placed at the reference rotational position (the second speed change position or the reverse position in this embodiment), the second shift fork 150(2) is retained at the reference position; when the first and second drums 170(1) and 170(2) are placed from the reference rotational position to one (the second-side-around-axis first rotational position in this embodiment, or the fourth speed change position or the parking position P in FIG. 10) of the first-side-around-axis first rotational position and the second-side-around-axis first rotational position, the second shift fork 150(2) is retained at the displaced position (the second displaced position in FIG. 10); and as the first and second drums 170(1) and 170(2) are rotated from the reference rotational position (the second speed change position or the reverse position in this embodiment) to the one rotational position, the second shift fork 150(2) is moved from the reference position to the corresponding displaced position, and as the first and second drums 170(1) and 170(2) are rotated from the one rotational position to the reference rotational position (the second speed change position or the reverse position in this embodiment), the second shift fork 150(2) is moved from the corresponding displaced position to the reference position.

In this embodiment, as indicated by the portion A in FIG. 10, the second guide groove 182 further has such a groove shape for engagement with the second engagement pin 153(2) that the second shift fork 150(2) is retained at the reference position when the first and second drums 170(1) and 170(2) are rotated between the reference rotational position and the first-side-around-axis first rotational position.

According to this configuration, when the operation shaft 160 (the drum member) is placed at the reference rotational position (the second speed change position or the reverse position in this embodiment), the second shift fork 150(2) is placed at the reference position, and the second slider 130(2) is not engaged with the corresponding speed change member (the fourth speed change member 120(4) in this embodiment), while the first shift fork 150(1) is placed at the displaced position due to the biasing force of the first fork spring 220(1), and the first slider 130(1) is engaged with the corresponding speed change member (the second speed change member 120(2) in this embodiment), and thereby the corresponding second speed change state is provided.

When the operation shaft 160 (the drum member) is placed at the second-side-around-axis first rotational position (the fourth speed change position or the parking position P in this embodiment), the first shift fork 150(1) is retained at the reference position by the first guide groove 181, and the first slider 130(1) is not engaged, while the second shift fork 150(2) is retained at the second displaced position by the second guide groove 182, and the second slider 130(2) is engaged with the corresponding speed change member (the fourth speed change member 120(4) in this embodiment), and thereby the corresponding fourth speed change state (the parking state) is provided.

When the operation shaft 160 (the drum member) is placed at the first-side-around-axis first rotational position (the neutral position N in this embodiment), the first shift fork 150(1) is retained at the reference position by the first guide groove 181 and the first slider 130(1) is not engaged, and the second shift fork 150(2) as well is retained at the reference position by the second guide groove 182 and the second slider 130(2) as well is not engaged, and thereby the corresponding speed change state (the neutral state or a power transmission blocked state) is provided.

Here, when the operation shaft 160 (the drum member) is rotatively operated from one to the other of the first-side-around-axis first rotational position (the neutral position N in this embodiment) and the second-side-around-axis first rotational position (the second speed change position or the parking position P in this embodiment), the operation shaft 160 passes through the reference rotational position located between both rotational positions.

However, when the operation shaft 160 is rotatively operated so as to pass through the reference rotational position in a time shorter than the time required for the first shift fork 150(1) to move from the reference position to the second displaced position by the biasing force of the first fork spring 220(1), a speed change state that is provided when the operation shaft 160 is placed at the reference rotational position (the second speed change state or the reverse state in this embodiment) is not actually provided, and the speed change operation can be performed between the speed change state provided when the operation shaft 160 (the drum member) is placed at the first-side-around-axis first rotational position (the neutral position N in this embodiment) and the speed change state provided when the operation shaft 160 is placed at the second-side-around-axis first rotational position (the fourth speed change position or the parking position in this embodiment).

As described above, the shift-drum speed change mechanism 100 of this embodiment has a first-side-along-axis first-slider speed change member (the first speed change member 120(1)) and a second-side-along-axis first-slider speed change member (the second speed change member 120(2)) disposed on one and the other sides of the first slider 130(1) as first-slider speed change members engageable with the first slider 130(1); and a first-side-along-axis second-slider speed change member (the third speed change member 120(3)) and a second-side-along-axis second-slider speed change member (the fourth speed change member 120(4)) disposed on one and the other sides of the second slider in the axis direction as second-slider speed change members engageable with the second slider 130(2).

The first shift fork 150(1) is configured to cause the first slider 130(1) to be not engaged with any of the first-side-along-axis first-slider speed change member (the first speed change member 120(1)) and the second-side-along-axis first-slider speed change member (the second speed change member 120(2)) when placed at the reference position, and is configured to be capable of taking as the aforementioned displaced positions the first displaced position that causes the first slider 130(1) to be depression/projection-engaged with the first-side-along-axis first-slider speed change member (the first speed change member 120(1)) so that both components are rotated integrally, and the second displaced position that causes the first slider 130(1) to be depression/projection-engaged with the second-side-along-axis first-slider speed change member (the second speed change member 120(2)) so that both components are rotated integrally.

The second shift fork 150(2) is configured to cause the second slider 130(2) to be not engaged with any of the first-side-along-axis second-slider speed change member (the third speed change member 120(3)) and the second-side-along-axis second-slider speed change member (the fourth speed change member 120(4)) when placed at the reference position, and is configured to be capable of taking as the aforementioned displaced positions the first displaced position that causes the second slider 130(2) to be depression/projection-engaged with the first-side-along-axis second-slider speed change member (the third speed change member 120(3)) so that both components are rotated integrally, and the second displaced position that causes the second slider 130(2) to be depression/projection-engaged with the second-side-along-axis second-slider speed change member (the fourth speed change member 120(4)) so that both components are rotated integrally.

Furthermore, the operation shaft 160 (the drum member) is configured to be capable of further taking a first-side-around-axis second rotational position (the first speed change position in this embodiment) when rotated predetermined degrees from the first-side-around-axis first rotational position toward one side around the axis, and a first-side-around-axis third rotational position (the third speed change position in this embodiment) when rotated predetermined degrees from the first-side-around-axis second rotational position toward one side around the axis, in addition to the reference rotational position (the second speed change position or the reverse position in this embodiment), the second-side-around-axis first rotational position (the fourth speed change position or the parking position P in this embodiment), and the first-side-around-axis first rotational position (the neutral position N in this embodiment).

As shown in FIG. 10, in this configuration, the first guide groove 181 further has such a groove shape for engagement with the first engagement pin 153(1) that the first shift fork 150(1) is retained at the first displaced position and the reference position when the operation shaft 160 (the drum member) is placed at the first-side-around-axis second rotational position and the first-side-around-axis third rotational position, respectively; the first shift fork 150(1) is moved from the reference position to the first displaced position as the operation shaft 160 (the drum member) is rotated from the first-side-around-axis first rotational position to the first-side-around-axis second rotational position; the first shift fork 150(1) is moved in the opposite direction as the drum member is rotated in the opposite direction; the first shift fork 150(1) is moved from the first displaced position to the reference position as the operation shaft 160 (the drum member) is rotated from the first-side-around-axis second rotational position to the first-side-around-axis third rotational position; and the first shift fork 150(1) is moved in the opposite direction as the drum member is rotated in the opposite direction.

The second guide groove 182 has such a groove shape for engagement with the second engagement pin 153(2) that the second shift fork 150(2) is retained at the reference position when the operation shaft 160 (the drum member) is rotated between the first-side-around-axis first rotational position and the first-side-around-axis second rotational position; the second shift fork 150(2) is retained at the first displaced position when the operation shaft 160 (the drum member) is placed at the first-side-around-axis third rotational position; and the second shift fork 150(2) is moved from the reference position to the first displaced position as the operation shaft 160 (the drum member) is rotated from the first-side-around-axis second rotational position to the first-side-around-axis third rotational position; and the second shift fork 150(2) is moved in the opposite direction as the drum member is rotated in the opposite direction.

As described above, in this embodiment, a portion of the second guide groove 182 with which the second engagement pin 153(2) is engaged when the operation shaft 160 (the drum member) is placed at the rotational positions on one side around the axis is formed so as to retain the second shift fork 150(2) at the reference position (see the portion A in FIG. 10).

Figure 11:
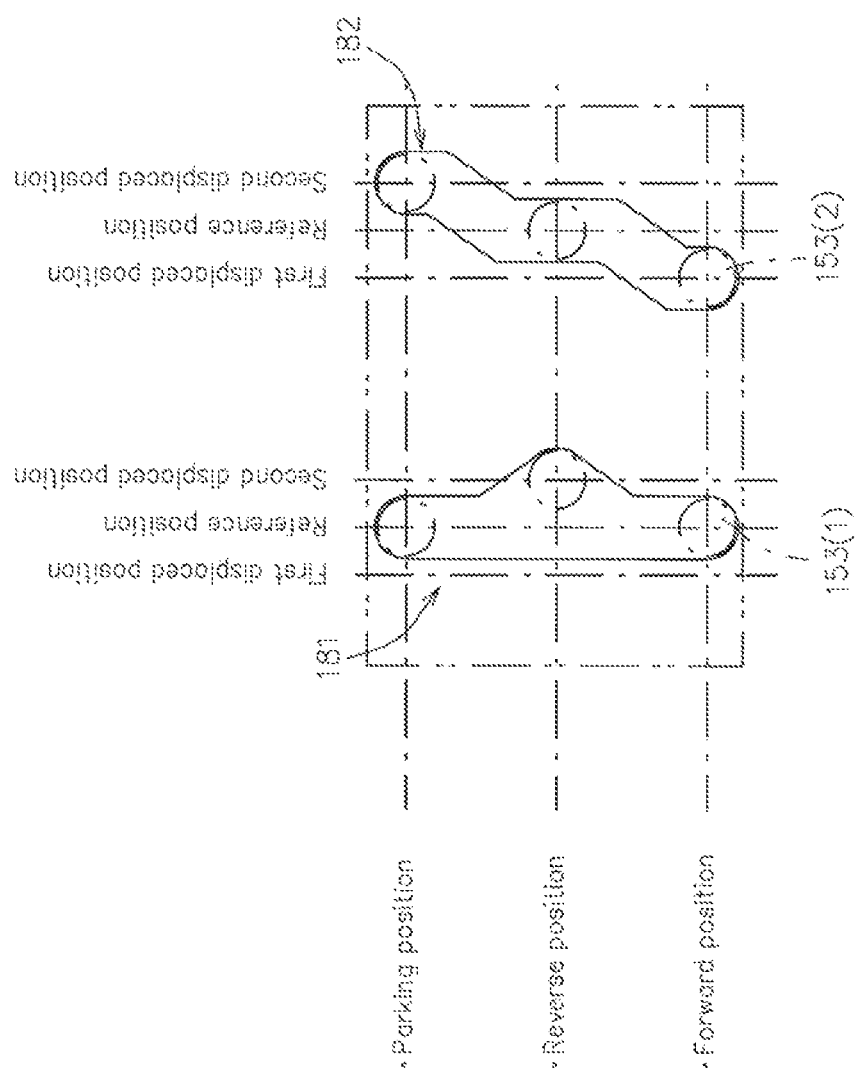
FIG. 11 is an exploded view of modified first and second guide grooves, and shows a portion corresponding an A portion in FIG. 10.

In place of this configuration, as shown in FIG. 11, it is also possible to configure the second guide groove 182 to have such a groove shape for engagement with the second engagement pin 153(2) that the second shift fork 150(2) is moved from the reference position to the first displaced position as the operation shaft 160 (the drum member) is rotated from the reference rotational position to the first-side-around-axis first rotational position, the second shift fork 150(2) is retained at the first displaced position when the operation shaft 160 (the drum member) is operated to the first-side-around-axis first rotational position, and the second shift fork 150(2) is moved from the first displaced position to the reference position as the operation shaft (the drum member) is rotated from the first-side-around-axis first rotational position to the reference position.

As shown in FIGS. 2 to 9, the shift-drum speed change mechanism 100 of this embodiment further comprises a detent mechanism 300 for locking the operation shaft 160 at respective operational positions or speed change positions.

Figure 12:
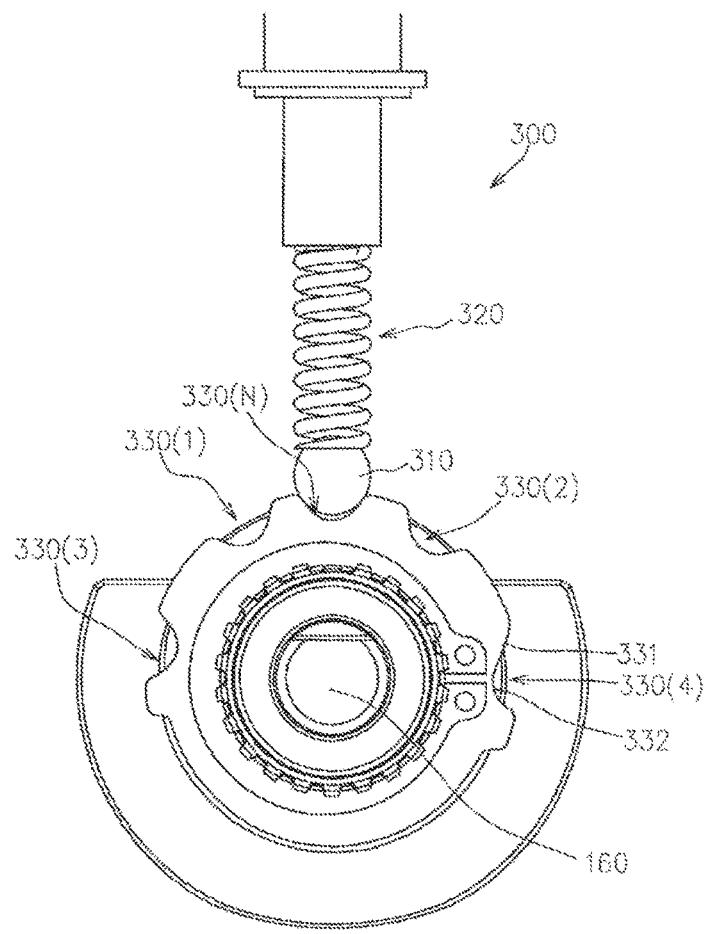
FIG. 12 is an end view of a detent mechanism in the shift-drum speed change mechanism, taken along the line XII-XII in FIG. 8.

FIG. 12 shows an end view of the shift-drum speed change mechanism 100 taken along the line XII-XII in FIG. 8.

As shown in FIG. 12, the detent mechanism 300 has a detent projecting member 310, a biasing member 320 biasing the detent projecting member 310 toward a predetermined part of the outer surface of the operation shaft 160, and detent depressions 330 formed in the outer circumferential surface of the operation shaft 160.

In this embodiment, a rolling element (a ball) is used as the detent projecting member 310 as shown in FIG. 12.

As described above, the operation shaft 160 is configured to take the neutral position N, the first speed change position when rotated from the neutral position N toward one side around the axis, the third speed change position when rotated from the first speed change position toward one side around the axis, the second speed change position when rotated from the neutral position toward the other side around the axis, and the fourth speed change position when rotated from the second gearshift position toward the other side around the axis.

Accordingly, as shown in FIG. 12, the detent depressions 330 include a depression 330(N) for the neutral position, a depression 330(1) for the first speed change position, a depression 330(3) for the third speed change position, a depression 330(2) for the second speed change position, and a depression 330(4) for the fourth speed change position, into which the detent projecting member 310 is inserted when the operation shaft 160 is placed at the neutral position N, the first speed change position, the third speed change position, the second speed change position, and the fourth speed change position, respectively.

Meanwhile, although the operation shaft 160 can be locked at a desired operational position or speed change position around the axis by the engagement of the detent projecting member 310 and the detent depressions 330, it is difficult to reliably maintain a speed change state (a speed change position) while maintaining the favorable operability of the operation shaft 160 solely by such engagement.

That is, increasing the biasing force of the detent biasing member 320 makes it possible to increase the locking force exerted by the detent mechanism 300 and maintain the speed change state even when an unintended large external force is applied, while a large operational force is required when operating the operation shaft 160 around the axis.

On the other hand, although reducing the biasing force of the detent biasing member 320 makes it possible to easily operate the operation shaft 160 around the axis, the locking force of the detent is reduced.

Concerning this point, in this embodiment, the following configuration is adapted to reliably maintain the speed change state while maintaining the favorable operability of the operation shaft 160 around the axis.

That is, as shown in FIG. 10, the second guide groove 182 has a central-around-axis part 185A (a region extending from the first-speed-change engagement part 180(1) to the second-speed-change engagement part 180(2)) engaged with the second engagement pin 153(2) such that the second shift fork 150(2) is retained at the reference position with respect to the axial direction relative to the second drum 170(2); a first-side-around-axis speed change engagement part 185B (the third-speed-change engagement part 180(3)) that is disposed adjacent to the central-around-axis part 185A and is engaged with the second engagement pin 153(2) such that the second shift fork 150(2) is retained at the first displaced position displaced from the reference position toward one side in the axial direction relative to the second drum 170(2); and a second-side-around-axis speed change engagement part 185C (the fourth-speed-change engagement part 180(4)) that is disposed adjacent to the central-around-axis part 185A on the opposite side from the first-side-around-axis speed change engagement part 185B and is engaged with the second engagement pin 153(2) such that the second shift fork 150(2) is retained at the second displaced position displaced from the reference position toward the other side in the axial direction relative to the second drum 170(2).

As shown in FIG. 10, the transitional region between the central-around-axis part 185A and the first-side-around-axis speed change engagement part 185B (i.e., the transitional region between the first-speed-change engagement part 180(1) and the third-speed-change engagement part 180(3)) has a first-side-around-axis inclined part 186B, inclined relative to the circumferential direction and the axial direction of the second drum 170(2) such that the second shift fork 150(2) is relatively moved in the axial direction from the reference position toward the first displaced position relative to the second drum 170(2) as the operation shaft 160 is rotated from the center-side-around-axis speed change positions including the neutral position N (i.e., speed change positions including the first speed change position, the neutral position, and the second speed change position) toward a first-side-around-axis speed change position (i.e., the third speed change position), and the second shift fork 150(2) is relatively moved in the axial direction from the second displaced position toward the reference position relative to the second drum 170(2) as the operation shaft 160 is rotated in the opposite direction.

The transitional region between the central-around-axis part 185A and the second-side-around-axis speed change engagement part 185C (i.e., the transitional region between the second-speed-change engagement part 180(2) and the fourth-speed-change engagement part 180(4)) has a second-side-around-axis inclined part 186C, inclined relative to the circumferential direction and the axial direction of the second drum 170(2) such that the second shift fork 150(2) is relatively moved in the axial direction from the reference position toward the second displaced position relative to the second drum 170(2) as the operation shaft 160 is rotated from center-side-around-axis speed change positions including the neutral position N (i.e., speed change positions including the first speed change position, the neutral position, and the second speed change position) toward a second-side-around-axis speed change position (i.e., the fourth speed change position), and the second shift fork 150(2) is relatively moved in the axial direction from the second displaced position toward the reference position relative to the second drum 170(2) as the operation shaft 160 is rotated in the opposite direction; and a pocket 187C located between the end of the second-side-around-axis inclined part 186C close to the second-side-around-axis speed change engagement part 185C and the second-side-around-axis speed change engagement part 185C, and extends in the circumferential direction of the second drum 170(2) such that the second shift fork is retained at the second displaced position with respect to the axial direction relative to the second drum 170(2).

As shown in FIG. 12, among the detent depressions 330, a depression for the second-side-around-axis speed change position (the depression for the fourth speed change position 330(4) in this embodiment) that is engaged with the detent projection 310 when the second engagement pin 153(2) is engaged with the second-side-around-axis speed change engagement part 185C on the other side has an inclined surface 331 that is adjacent to the bordering region between the aforementioned depression for the second-side-around-axis speed change position and the depressions for the center-side-around axis speed change positions (the depression for the first speed change position 330(1), the depression for the neutral position 330(N), and the depression for the second speed change position 330(2) in this embodiment) that is engaged with the detent projection 310 when the second engagement pin 153(2) is engaged with the central-around-axis part 185A, and a deepest part 332 that is continuous with the inclined surface 331.

The inclined surface 331 descends in the direction of leaving the depressions for the center-side-around axis speed change positions (the depressions for the first speed change position 330(1), the depression for the neutral position 330(N), and the depression for the second speed change position 330(2)) in this embodiment) with respect to the circumferential direction.

Figure 13:
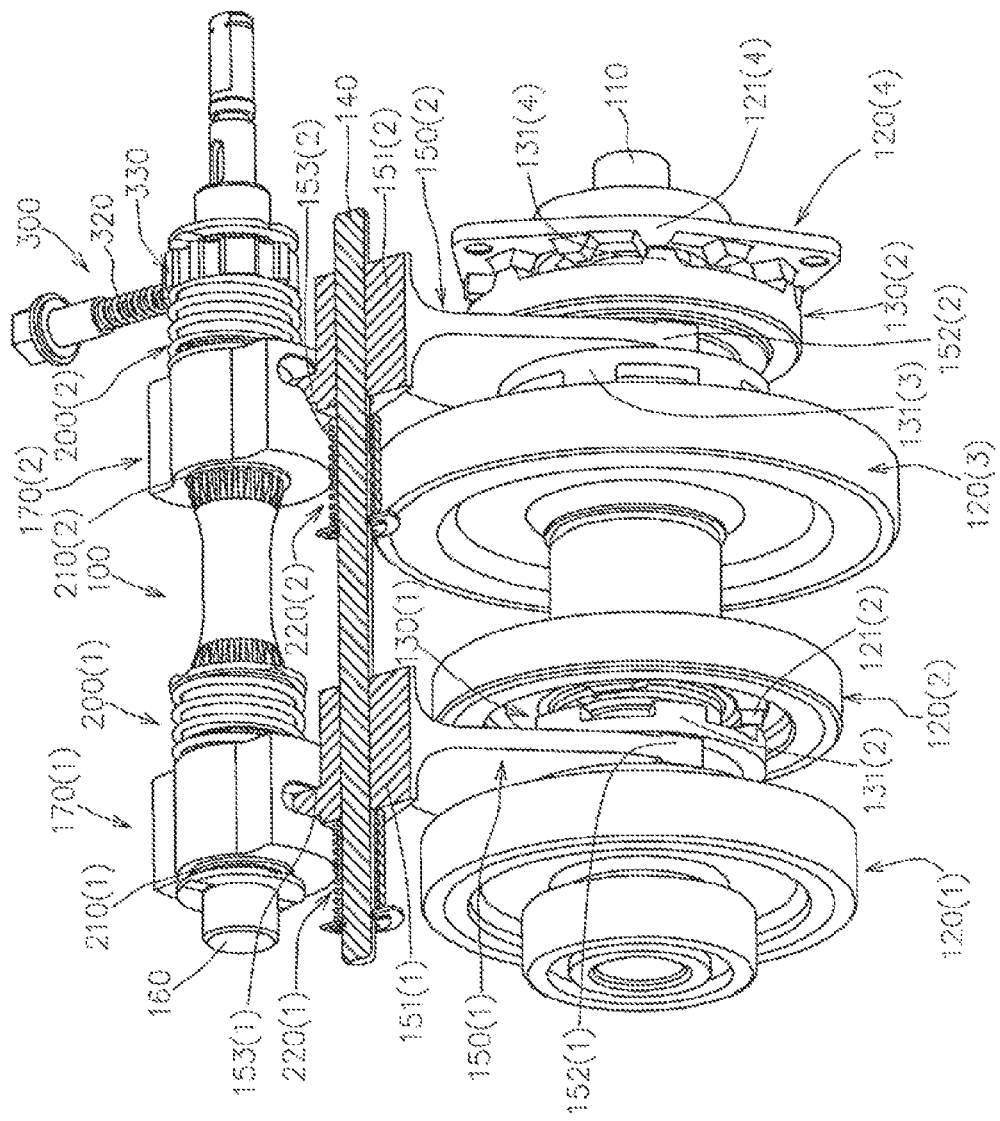
FIG. 13 is a partial vertical cross-sectional perspective view of the shift-drum speed change mechanism, and shows a speed change incomplete state where a second slider of the shift-drum speed change mechanism cannot be positioned at a fourth speed change position since engagement parts of the second slider and a fourth speed change member of the shift-drum speed change mechanism collide with each other.

FIG. 13 shows a partial vertical cross-sectional view of the shift-drum speed change mechanism 100 in a speed change incomplete state where the depression/projection engagement parts of the second slider 130(2) and a second-side-along-axis speed change member or the-other-side-along-axis speed change member (the fourth speed change member 120(4) in this embodiment) collide with each other, and thus the second slider 130(2) cannot be immediately depression/projection-engaged with the second-side-along-axis speed change member, when the operation shaft 160 is rotated from the center-side-around-axis speed change position toward the second-side-around-axis speed change position to move the second slider from the neutral position to the second-side-along-axis speed change position.

Figure 14:
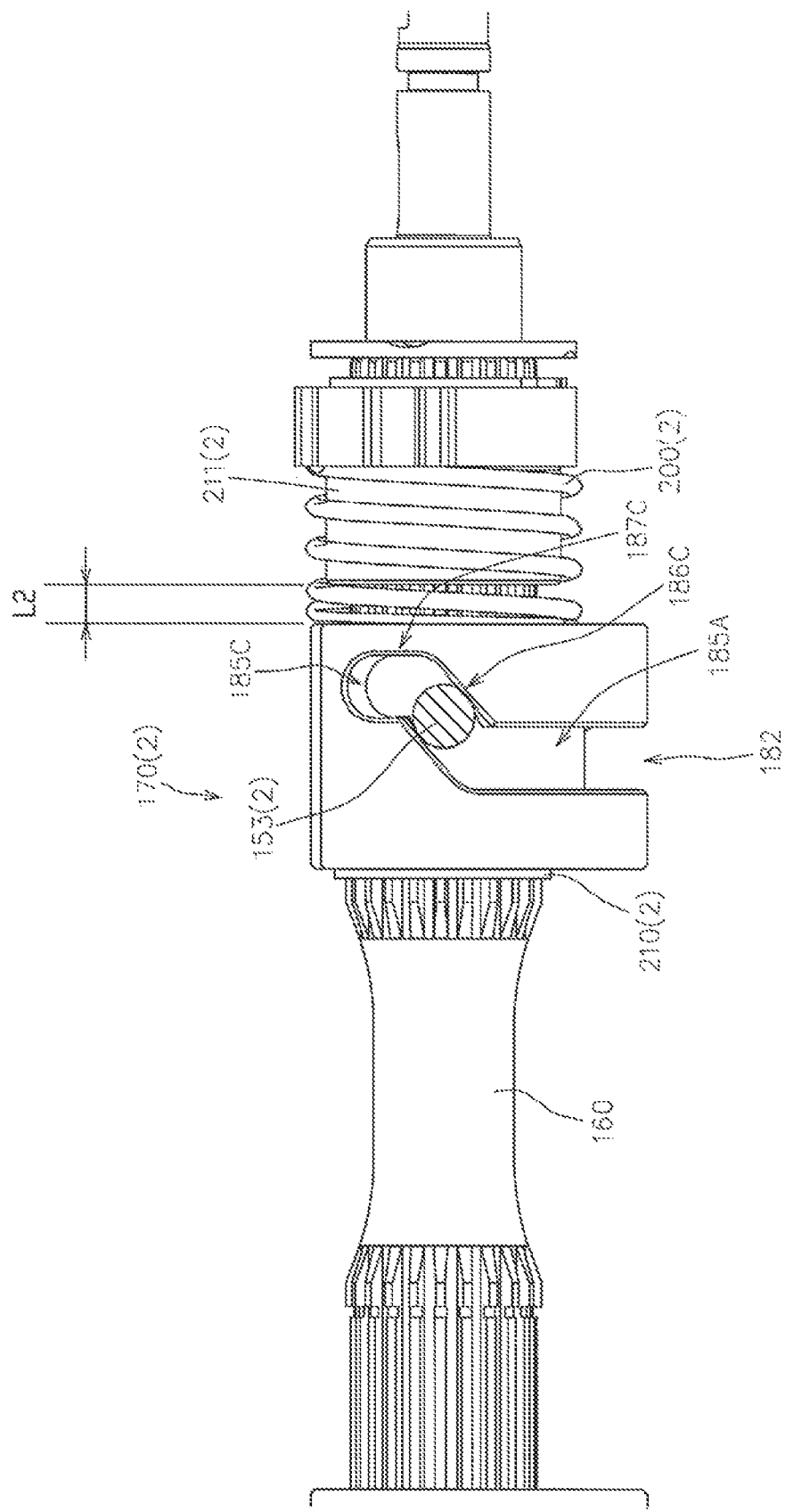
FIG. 14 is an enlarged bottom view of the operation shaft assembly, and shows an engaging position of a second engagement pin relative to a second guide groove in the speed change incomplete state.

FIG. 14 shows the relative position of the second engagement pin 153(2) relative to the second guide groove 182 in the speed change incomplete state.

Figure 15:
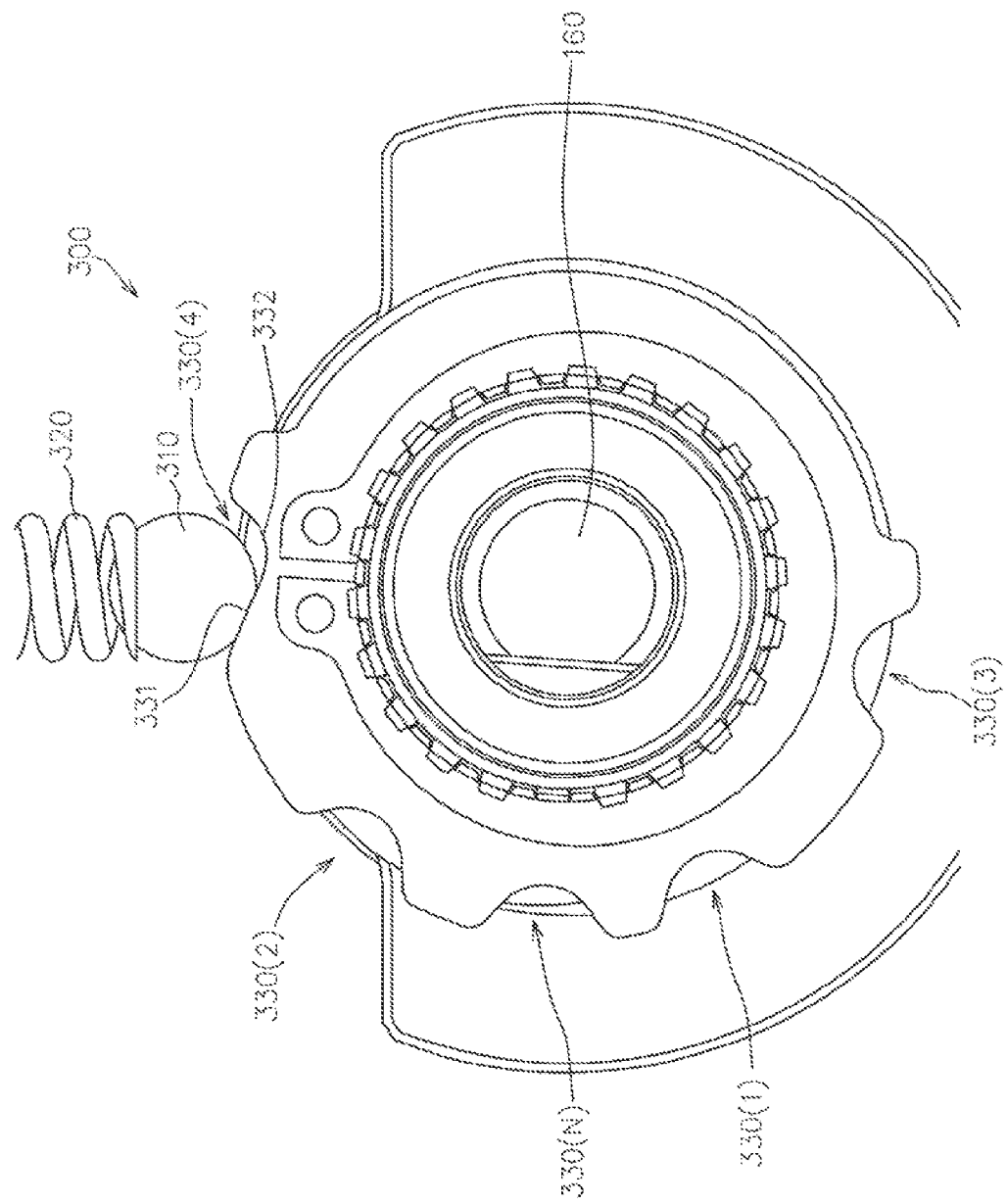
FIG. 15 is an end view of the detent mechanism in the speed change incomplete state.

Moreover, FIG. 15 shows an end view of the detent mechanism 300 in the speed change incomplete state.

As shown in FIGS. 13 and 14, in this embodiment, the second engagement pin 153(2) is in engagement with the second-side-around-axis inclined part 186C, and the detent projecting member 310 is in engagement with the middle section of the inclined surface 331, in the speed change incomplete state.

According to this configuration, the operation shaft 160 is rotatively biased toward the second-side-around-axis speed change position due to the biasing force of the detent biasing member 320 for pressing the detent projecting member 310 against the inclined surface 331, and therefore even when the force of manual operation on the operation shaft 160 is released in the speed change incomplete state, the second slider 130(2) is moved to the corresponding speed change position when the circumferential positions of the depression/projection engagement parts of the second slider 130(2) and the second-side-along-axis speed change member match.

Furthermore, after the second slider 130(2) is depression/projection-engaged with the second-side-along-axis speed change member, the operation shaft 160 is continuously rotated toward the other side around the axis due to the biasing force of the detent biasing member 320, and a state where the second engagement pin 153(2) is inserted into the pocket 187C is provided.

At this time, due to the cam action with the second guide groove 182, the second engagement pin 153(2) moves to the terminal position of the second-side-around-axis inclined part 186C (the end position on the side adjacent to the pocket 187C) while rotating the operation shaft 160 around the axis toward the second-side-around-axis speed change position.

It is difficult to insert the second engagement pin 153(2) into the pocket 187C along the circumferential direction of the second drum 170(2) solely by the cam action of the second engagement pin 153(2) and the second guide groove 182, but in this embodiment, as described above, the detent projecting member 310 is engaged with the middle section of the inclined surface 331 in the speed change incomplete state, and a rotational force toward the second side or the other side around the axis is thus applied to the operation shaft 160 due to the biasing force of the detent biasing member 320. Accordingly, the second engagement pin 153(2) is inserted into the second-side-around-axis speed change engagement part 185C via the pocket 187C.

In the configuration where the second engagement pin 153(2) is inserted into the second-side-around-axis speed change engagement part 185C on the other side provided adjacent to the pocket 187C, a force that rotates the operation shaft 160 around the axis is not applied to the operation shaft 160 even when an unintended external force toward one side in the axial direction is applied to the second slider 130(2) and the second shift fork 150(2).

It is thus possible to favorably maintain the state of engagement between the second slider 130(2) and the second-side-along-axis speed change member without increasing the biasing force of the detent biasing member 320.

Preferably, as shown in FIG. 10, a pocket 187B may be provided in the transitional region between the central-around-axis part 185A and the first-side-around-axis speed change engagement part 185B, which is located between the first-side-around-axis speed change engagement part 185B and the end of the first-side-around-axis inclined part 186B on the side close to the first-side-around-axis speed change engagement part 185B and extends in the circumferential direction of the second drum 170(2) such that the second shift fork 150(2) is retained at the first displaced position with respect to the axial direction relative to the second drum 170(2).

This configuration makes it possible to effectively maintain the state of engagement between the second slider 130(2) and a first-side-along-axis speed change member without increasing the biasing force of the detent biasing member 320.

The insertion of the second engagement pin 153(2) into the first-side-around-axis speed change engagement part 185B from the central-around-axis part 185A via the pocket 187B is performed by manual operation on the operation shaft 160.

That is, even in a speed change incomplete state where the depression/projection engagement parts of the second slider 130(2) and the first-side-along-axis speed change member (the third speed change member 120(3) in this embodiment) collide with each other and thus the second slider 130(2) cannot be depression/projection-engaged with the speed change member when the operation shaft 160 is rotated from the center-side-around-axis speed change position (the operation positions including the first speed change position, the neutral position, and the second speed change position in this embodiment) toward the first-side-around-axis speed change position (the third speed change position in this embodiment) to move the second slider 130(2) from the neutral position to a first-side-along-axis speed change position, it is possible to rotatively operate the operation shaft 160 so that only the operation shaft 160 reaches the first-side-around-axis speed change position first.

At this time, since the second slider 130(2) and the second shift fork 150(2) cannot moved toward a second side or the other side in the axial direction, the second drum 170(2) moves toward the second side or the other side in the axial direction while compressing the second drum spring 200(2), and accordingly the biasing force of the second drum spring 200(2) that biases the second drum 170(2) toward the first side or one side in the axial direction has been increased.

Therefore, when the circumferential positions of the depression/projection engagement parts of the second slider 130(2) and the first-side-along-axis speed change member match, the second shift fork 150(2) and the second slider 130(2) are pushed to the first-side-along-axis speed change position by the biasing force of the second drum spring 200(2).

In this embodiment where the second fork spring 220(2) is provided, in addition that the detent biasing member 320 biases the operational shaft 160 toward the second side or the other side around the axial direction, the second fork spring 220(2) biases the second shift fork 150(2) toward the second side or the other side in the axial direction. Therefore, when the circumferential positions of the depression/projection engagement parts of the second slider 130(2) and the second-side-along-axis speed change member match, the second slider 130(2) is reliably pushed to the second-side-along-axis speed change position by the biasing force of the detent biasing member 320 and the biasing force of the second fork spring 220(2).

Although the shift-drum speed change mechanism 100 of this embodiment has two drums (the first and second drums 170(1) and 170(2)), the present invention is not limited to such an embodiment, and can be modified to have only one drum.

In such a modification, the first and second guide grooves 181 and 182 are formed in a single drum, a single drum spring is provided in place of the first and second drum springs 200(1) and 200(2), and a single stopper is provided in place of the first and second stoppers 210(1) and 210(2).

In this case, the combined biasing force of the first and second fork springs 220(1) and 220(2) is configured to be smaller than the biasing force of the single drum spring.

As described above, in this embodiment, in the speed change incomplete state where the slider cannot reach a predetermined speed change position because the circumferential positions of the depression/projection engagement part of the slider and the depression/projection engagement part of the speed change member do not match, the biasing force exerted by the detent mechanism acts as a pushing force for pushing the slider to the predetermined speed change position.

Below, this action will now be described in detail.

In the configuration of this embodiment, when the second slider 130(2) is in a speed change incomplete state during transfer from the neutral position to the fourth speed change position, the biasing force of the detent mechanism 300 acts as a pushing force for pushing the second slider 130(2) toward the fourth speed change position.

That is, the fourth speed change member 120(4) is relatively rotatable relative to the power transmission rotating shaft.

As described above, the fourth speed change member 120(4) is a fixed component that is incapable of rotation, and when the second slider 130(2) is depression/projection-engaged with the fourth speed change member 120(4), a parking state is provided.

The second slider 130(4) is supported by the power transmission rotating shaft 110 so as to be incapable of relative rotation and movable in the axial direction, and is capable of taking a neutral position where it is not depression/projection-engaged with speed change members including the fourth speed change member 120(4) and a speed change position (the fourth speed change position in this embodiment) where it is depression/projection-engaged with the fourth speed change member 120(4).

In this embodiment, as described above, the second slider 130(2) is capable of depression/projection engagement with another speed change member (the third speed change member 120(3) or a forward low-speed gear) different from the aforementioned speed change member (the fourth speed change member 120(4)).

That is, the second-side-along-axis speed change member (the third speed change member 120(3)) is relatively rotatable relative to the power transmission rotating shaft 110 on the opposite side of the second slider 130(2) from the aforementioned speed change member (the fourth speed change member 120(4)).

Moreover, the second slider 130(2) is capable of taking, in addition to the neutral position and the aforementioned speed change position (the fourth speed change position), another speed change position (the third speed change position in this embodiment) where it is depression/projection-engaged with the second-side-along-axis speed change member (the third speed change member 120(3)).

The engagement pin 153(2) of a shift fork (the second shift fork 150(2) in this embodiment) that moves the second slider 130(2) in the axial direction is inserted into a guide groove (the second guide groove 182) formed in the corresponding drum (the second drum 170(2)), and in accordance with the rotational operation around the axis of the operation shaft 160 that supports the drum (the second drum 170(2)) so as to be incapable of relative rotation around the axis, the engagement pin 153(2) is guided by the guide groove 182, the shift fork (the second shift fork 150(2)) is moved in the axial direction, and the second slider 130(2) is moved in the axial direction.

Specifically, the operation shaft 160 is configured to be capable of taking a neutral position, a speed change position (the fourth speed change position) reached when rotated from the neutral position toward one side around the axis, and another speed change position (the third speed change position) reached when rotated from the neutral position toward the other side around the axis.

The guide groove (the second guide groove 182) guides the engagement pin (the second engagement pin 153(2)) such that the shift fork (the second shift fork 150(2)) is retained at the neutral position when the operation shaft 160 is placed at the neutral position, the shift fork (the second shift fork 150(2)) is pushed in the direction in which the slider (the second slider 130(2)) comes close to the speed change member (the fourth speed change member 120(4)) when the operation shaft 160 is rotatively operated from the neutral position to a speed change position (the fourth speed change position), and the shift fork (the second shift fork 150(2)) is pushed in the direction in which the slider (the second slider 130(2)) comes close to the second-side-along-axis speed change member (the third speed change member 120(3)) when the operation shaft 160 is rotatively operated from the neutral position to another speed change position (the third speed change position).

As described above, the detent mechanism 300 has the detent projecting member 310, the detent biasing member 320, and the detent depressions 330.

As shown in, for example, FIG. 12, the detent depressions 330 include the depression for the neutral position 330(N) into which the detent projection 310 is inserted when the operation shaft 160 is placed at the neutral position, a depression for a speed change position (the depression for the fourth speed change position 330 (4)) into which the detent projection 310 is inserted when the operation shaft 160 is placed at a speed change position (the fourth speed change position), and a depression for another speed change position (the depression for the third speed change position 330 (3)) into which the detent projection 310 is inserted when the operation shaft 160 is placed at another speed change position (the third speed change position).

As described above, the shift-drum speed change mechanism 100 of this embodiment has, in addition to the second slider 130(2), the first slider 130(1) capable of depression/projection engagement with the first speed change member 120(1) and the second speed change member 120(2), the first shift fork 150(1) that moves the first slider 130(1) in the axial direction, and the first guide groove 181 into which the first engagement pin 153(1) of the first shift fork 150(1) is inserted, and also has the first drum 170(1) that is supported by the operation shaft 160 so as to be incapable of relative rotation around the axis.

In this configuration, the operation shaft 160 is capable of taking the second speed change position located between the neutral position and the aforementioned speed change position (the fourth speed change position) and the first speed change position located between the neutral position and the other speed change position (the third speed change position) in addition to the neutral position, the aforementioned speed change position (the fourth speed change position), and the other speed change position (the third speed change position) with respect to the operational positions around the axis.

Therefore, as shown in, for example, FIG. 12, the detent depressions 130 include, in addition to the depression for the neutral position 330(N), the aforementioned depression for the speed change position (the depression for the fourth speed change position 330(4)), and the depression for another speed change position (the depression for the third speed change position 330(3)), the depression for the first speed change position 330(1) provided between the depression for the neutral position 330(N) and the depression for another speed change position (the depression for the third speed change position 330(3)) with respect to the circumferential direction such that the detent projection 310 is inserted when the operation shaft 160 is placed at the first speed change position, and the depression for the second speed change position 330(2) provided between the depression for the neutral position 330(N) and the aforementioned depression for the speed change position (the depression for the fourth speed change position (4)) with respect to the circumferential direction such that the detent projection 310 is inserted when the operation shaft 160 is placed at the second speed change position.

Here, the detent depressions other than the aforementioned depression for the speed change position (the depression for the fourth speed change position 330(4)), substantially, are commonly-used detent depressions that can selectively provide a locked state where the detent projection 310 is inserted into the deepest part and an unlocked state where the locking of the detent projection 310 is cancelled.

On the other hand, the aforementioned depression for the speed change position (the depression for the fourth speed change position 330(4)) is configured to produce a biasing force for biasing the operation shaft 160 toward the corresponding speed change position around the axis (the fourth speed change position) in a speed change incomplete state that occurs when the slider (the second slider 130(2)) moves from the neutral position to a speed change position (the fourth speed change position) with respect to the axial direction.

Specifically, as described above, the aforementioned depression for the speed change position (the depression for the fourth speed change position 330(4)) has the deepest part 332 that causes the detent projecting member 310 to be placed at the most radially inward part of the operation shaft 160, and the inclined surface 331 that is located on the side circumferentially closer to the depression for the neutral position 330(N) than the deepest part 332 is and that ascends toward the depression for the neutral position 330(N) from the deepest part 332.

As shown in FIG. 15, the inclined surface 331 has a smaller angle of inclination than other detent depressions so as to be engaged with the detent projecting member 310 when the slider (the second slider 130(2)) is at a speed change incomplete position between the neutral position and a speed change position (the fourth speed change position) with respect to the axial direction.

According to this configuration, in a speed change incomplete state where the depression/projection engagement parts of the slider (the second slider 130(2)) and the speed change member (the fourth speed change member 120(4)) collide with each other and thus the slider (the second slider 130(2)) cannot be immediately depression/projection-engaged with the speed change member (the fourth speed change member 120(4)) when the slider (the second slider 130(2)) is moved from the neutral position to a speed change position (the fourth speed change position) in the axial direction by rotating the operation shaft 160 from the neutral position toward a speed change position (the fourth speed change position) around the axis, the operation shaft 160 is biased toward the speed change position (the fourth speed change position) around the axis by the detent biasing member 320 and the depression for the speed change position (the depression for the fourth speed change position 330(4)).

Accordingly, when the circumferential positions of the depression/projection engagement parts of the slider (the second slider 130(2)) and the speed change member (the fourth speed change member 120(4)) match, the slider (the second slider 130(2)) is moved to the speed change position (the fourth speed change position) by the biasing force of the detent biasing member 320, without requiring subsequent manual operation on the operation shaft 160 or while reducing, as much as possible, subsequent manual operation required for rotatively operating the operation shaft 160 toward the speed change position.

As described above, in this embodiment, the second fork spring 220(2) biases the slider (the second slider 130(2)) toward the speed change member (the fourth speed change member 120(4)) via the second shift fork 150(2), and thus the second fork spring 220(2) in addition to the detent mechanism 300 also pushes the slider (the second slider 130(2)) toward the speed change position (the fourth speed change position).

In this embodiment, although a configuration in which the first and second shift forks 150(1) and 150(2) are supported by the fork shaft 140 has been described as an example, the present invention is not limited to such an embodiment.

Figure 16:
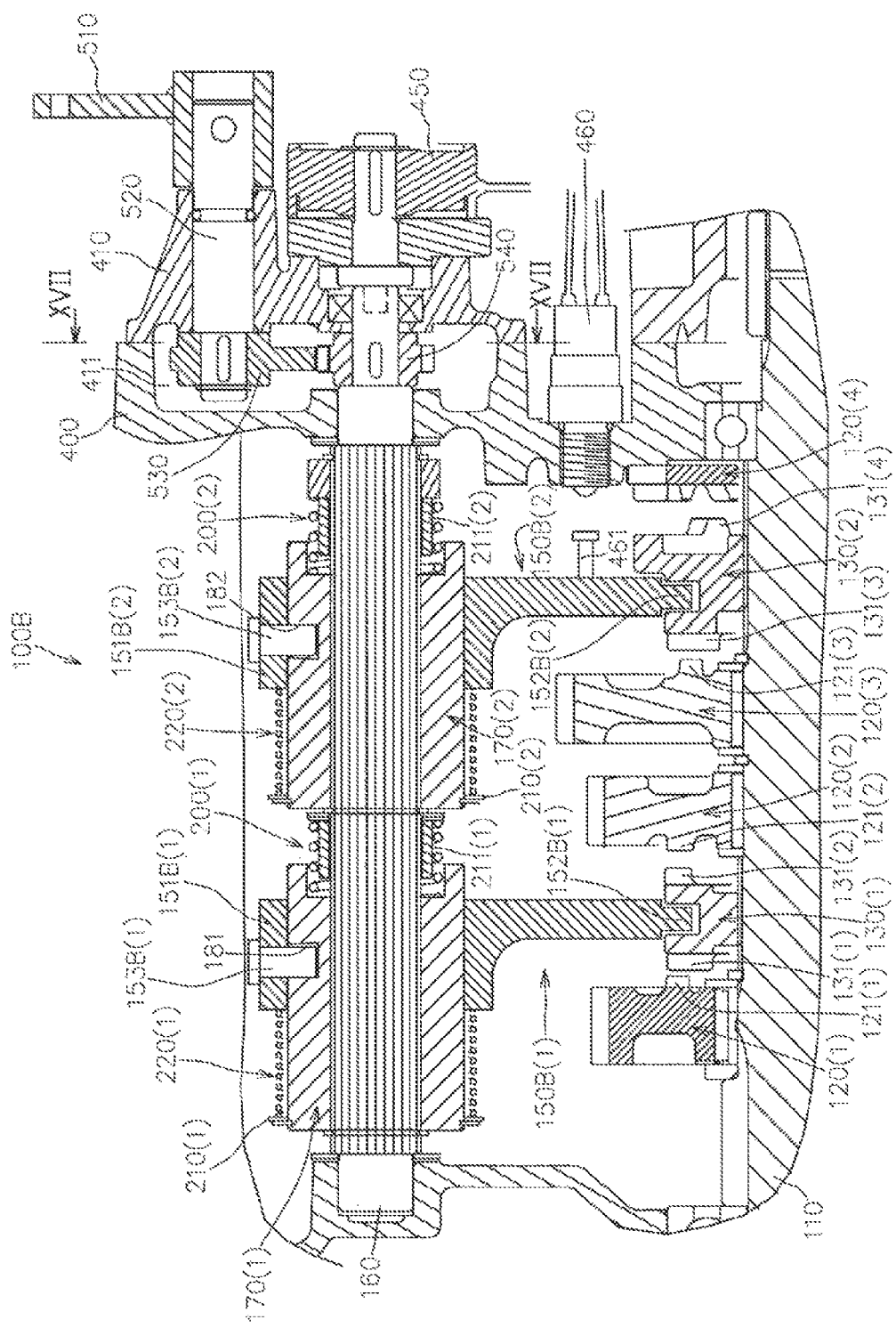
FIG. 16 is a vertical cross-sectional view of a shift-drum speed change mechanism according to a modification of the embodiment.

FIG. 16 shows a vertical cross-sectional view of a shift-drum speed change mechanism 100B according to a modification, comprising first and second shift forks 150B(1) 150B(2) having a different support structure.

Figure 17:
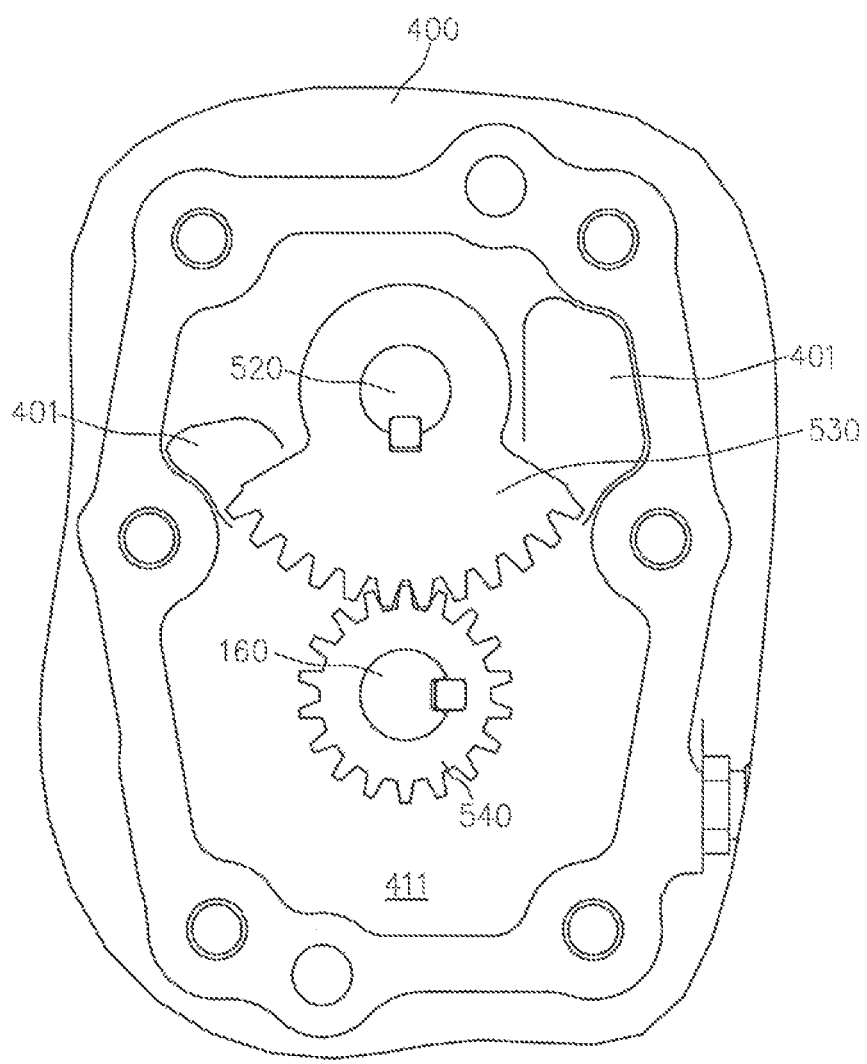
FIG. 17 is an end view taken along the line XVII-XVII in FIG. 16.

FIG. 17 shows an end view taken along the line XVII-XVII in FIG. 16.

In the drawing, the same components as those in the above embodiment are given the same reference numbers.

As shown in FIG. 16, in comparison to the shift-drum speed change mechanism 100 of the above embodiment, the shift-drum speed change mechanism 100B of this modification has first and second shift forks 150B(1) and 150B(2) in place of the first and second shift forks 150(1) and 150(2).

As described above, the shift-drum speed change mechanism 100 has the fork shaft 140 disposed in parallel with the operation shaft 160, and the first and second shift forks 150(1) and 150(2) are supported by the fork shaft 140 so as to be movable in the axial direction.

On the other hand, the modification 100B does not have the fork shaft 140, and as shown in FIG. 16, the first and second shift forks 150B(1) and 150B(2) are fitted to and supported by the first and second drums 170(1) and 170(2), respectively, so as to be movable in the axial direction.

Specifically, the first shift fork 150B(1) has a proximal part 151B(1) supported by the first drum 170(1) so as to be movable in the axial direction, a first slider engagement part 152B(1) engaged with the first slider 130(1), and a first engagement pin 153B(1) inserted into the first guide groove 181 formed in the first drum 170(1).

Likewise, the second shift fork 150B(2) has a proximal part 151B(2) supported by the second drum 170(2) so as to be movable in the axial direction, a second slider engagement part 152B(2) engaged with the second slider 130(2), and a second engagement pin 153B(2) inserted into the second guide groove 182 formed in the second drum 170(2).

The first and second fork springs 220(1) and 220(2) are fitted to and supported by the first and second drums 170(1) and 170(2), respectively, while being adjacent to the first and second shift forks 150B(1) and 150B(2).

Specifically, one end side of the first fork spring 220(1) is in contact with the first shift fork 150B(1), and the other end side is in contact with the first stopper member 210(1) for the first drum attached to the first drum 170(1).

One end side of the second fork spring 220(2) is in contact with the second shift fork 150B(2), and the other end side is in contact with the first stopper member 210(2) for the second drum attached to the second drum 170(2).

Reference number 400 in FIGS. 16 and 17 indicates a transmission case in which the shift-drum speed change mechanism 100B is accommodated, and reference number 410 is a gear cover removably attached to the transmission case 400.

Being attached to the transmission case 400, the gear cover 410 forms a gear chamber 411 together with the transmission case 400, and the drive-side operation gear 530 and the driven-side operation gear 540 are accommodated in the gear chamber 411.

The gear chamber 411 is in communication with the internal space of the transmission case 400 via communicating holes 401 (see FIG. 17).

In FIG. 16, reference number 450 indicates an operation position detecting sensor for detecting the position of the operation shaft 160 around the axis, reference number 460 indicates a parking position sensor for detecting that the shift-drum speed change mechanism 100B is in the fourth speed change state (a parking state), and reference number 461 is a detector that is brought into contact with the parking position sensor 450 when the shift-drum speed change mechanism 100B is in the fourth speed change state (i.e., a state where the second slider 130(2) is engaged with the fourth speed change member 120(4)).

For the embodiment 100 and the modification 100B, examples have been described in which the operation shaft 160 is manually operated. It is also possible to make changes to the specification such that the operation shaft 160 is electrically operated by an electric actuator instead.

Figure 18:
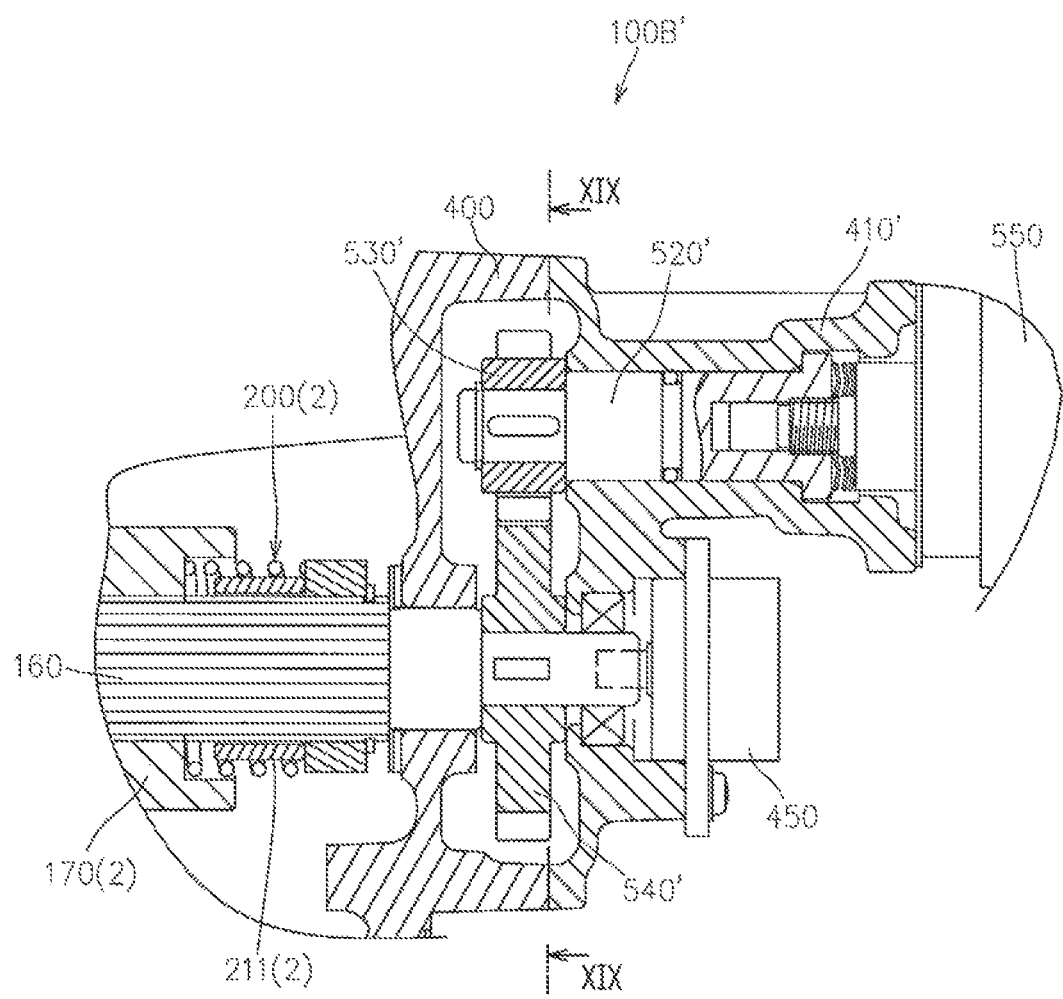
FIG. 18 is a partial vertical cross-sectional view of a modified example in which the shift-drum speed change mechanism shown in FIG. 16 is modified so that an operation shaft is operated by an electric actuator.

FIG. 18 shows a partial vertical cross-sectional view of an electrically operated specification 100B' obtained by altering the modification 100B such that the operation shaft 160 is operated by an electric actuator 550.

Figure 19:
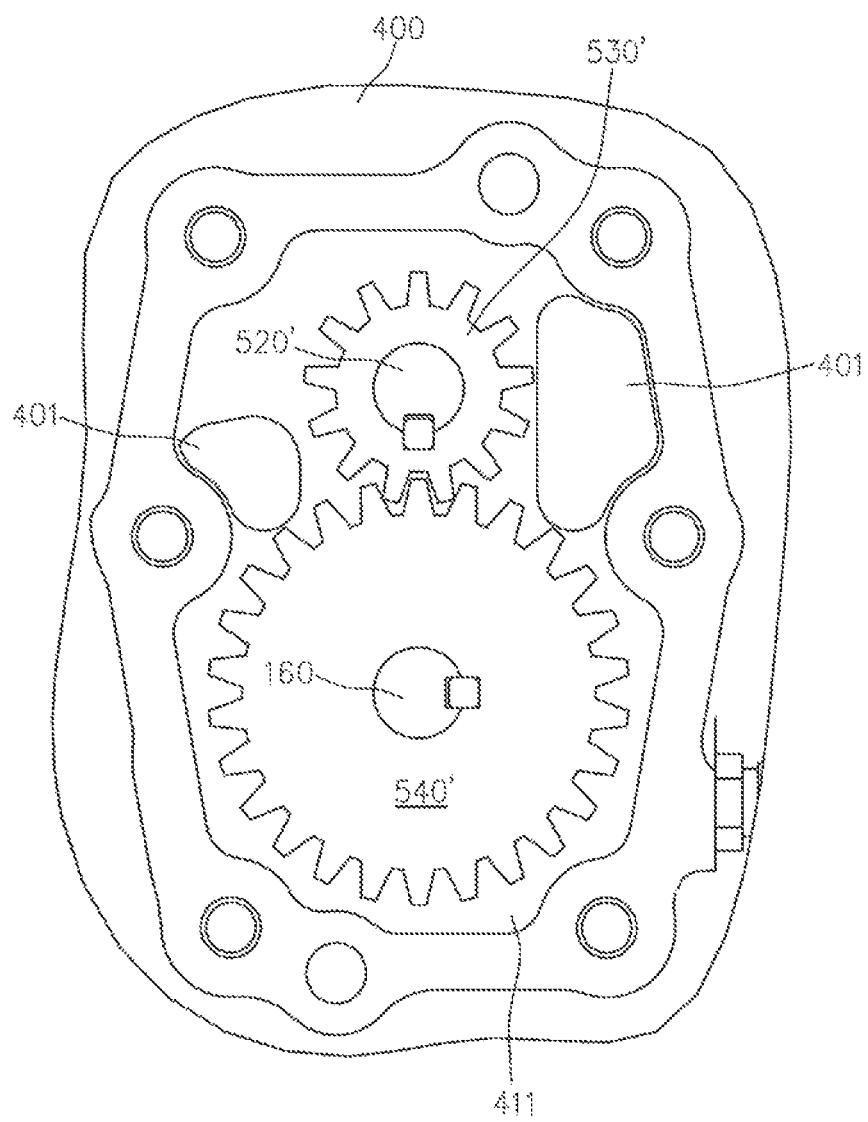
FIG. 19 is an end view taken along the line XIX-XIX in FIG. 18.

FIG. 19 shows an end view taken along the line XIX-XIX in FIG. 18.

The electrically operated specification 100B' shown in FIGS. 18 and 19 has an electric actuator 550 for operatively rotating the operation shaft 160 around the axis.

Specifically, in comparison to the manually operated specification 100B, the electrically operated specification 100B' has the electric actuator 550 and, further, a drive-side operation gear 530' and a driven-side operation gear 540' in place of the drive-side operation gear 530 and the driven-side operation gear 540.

Moreover, in the configuration shown in FIGS. 18 and 19, an operation transmission shaft 520', to the outer end face of which the electric actuator 550 can be connected, is provided in place of the operation transmission shaft 520, and a gear cover 410' is provided in place of the gear cover 410'.

The gear cover 410' is configured to be capable of supporting the operation transmission shaft 520' connected to the electric actuator 550.

Although the drive-side operation gear 530 and the driven-side operation gear 540 used in the manually operated specification have the number of teeth set to form a multiplying-gear train, the drive-side operation gear 530' and the driven-side operation gear 540' used for the electrically operated specification have the number of teeth set to form a reducing-gear train.

What is claimed is:

1. A shift-drum speed change mechanism comprising: a first slider that is supported by a power transmission rotating shaft so as to be incapable of relative rotation and movable in an axial direction between first and second speed change members relatively rotatable relative to the power transmission rotating shaft, and is capable of selectively taking a first speed change position where the first slider is engaged with the first speed change member, a neutral position where the first slider is not engaged with any of the first and second speed change members, and a second speed change position where the first slider is engaged with the second speed change member; a first shift fork that is supported so as to be movable in the axial direction, and causes the first slider to move in the axial direction in accordance with its own movement in the axial direction; a first drum provided with a first guide groove into which a first engagement pin of the first shift fork is inserted; and an operation shaft supporting the first drum so as to be incapable of relative rotation and movable in the axial direction, wherein the operation shaft is operable around an axis so as to be capable of taking a neutral position as well as first and second speed change positions when rotated from the neutral position toward one side and the other side around the axis, respectively, and the first slider is placed at the neutral position, the first speed change position, and the second speed change position in accordance with operation of the operation shaft to the neutral position, the first speed change position, and the second speed change position, respectively, the shift-drum speed change mechanism further comprising: a first drum spring biasing the first drum toward a first side in the axial direction, which is a side on which the first slider comes close to the first speed change member; a first fork spring biasing the first shift fork toward a second side in the axial direction, which is a side opposite to the first side in the axial direction, with a weaker biasing force than the first drum spring; a first stopper member for the first drum, defining an end of movement of the first drum toward the first side in the axial direction; and the first guide groove having a neutral engagement part, a first-speed-change engagement part and a second-speed-change engagement part with which the first engagement pin is respectively engaged when the operation shaft is placed at the neutral position, the first speed change position and the second speed change position, and the first guide groove having such a groove shape as to press the first engagement pin toward the first side in the axial direction by the rotational operation of the operation shaft from the neutral position to the first speed change position, not to press the first engagement pin along the axial direction by the rotational operation of the operation shaft from the neutral position to the second speed change position, and to allow the first shift fork to relatively move to the first drum between a reference position and a displaced position displaced from the reference position toward the second side in the axial direction when the operation shaft is placed at the second speed change position.

2. The shift-drum speed change mechanism according to claim 1, further comprising a second stopper member for the first drum that defines an end of movement of the first drum toward the second side in the axial direction, and is disposed so as to provide a gap between the second stopper member for the first drum and the first drum in contact with the first stopper member for the first drum.

3. The shift-drum speed change mechanism according to claim 1, further comprising: third and fourth speed change members supported so as to be relatively rotatable around the axis relative to the power transmission rotating shaft; a second slider that is supported by the power transmission rotating shaft so as to be incapable of relative rotation around the axis and movable in the axial direction between the third and fourth speed change members, and is capable of selectively taking a third speed change position where the second slider is engaged with the third speed change member, a neutral position where the second slider is not engaged with any of the third and fourth speed change members, and a fourth speed change position where the second slider is engaged with the fourth speed change member; a second shift fork that is supported so as to be movable in the axial direction, and causes the second slider to move in the axial direction in accordance with its own movement in the axial direction; a second drum that is supported by the operation shaft so as to be incapable of relative rotation around the axis and movable in the axial direction, and is provided with a second guide groove into which a second engagement pin of the second shift fork is inserted; a second drum spring biasing the second drum toward the first side in the axial direction; a second fork spring biasing the second shift fork toward the second side in the axial direction with a weaker biasing force than the second drum spring; and a first stopper member for the second drum, defining an end of movement of the second drum spring toward the first side in the axial direction, wherein the operation shaft takes a third speed change position when rotated from the first speed change position toward one side around the axis and a fourth speed change position when rotated from the second speed change position toward the other side around the axis, in addition to the neutral position, the first speed change position, and the second speed change position;

the first guide groove has, in addition to the neutral engagement part, the first-speed-change engagement part and the second-speed-change engagement part, a third-speed-change engagement part, and a fourth-speed-change engagement part with which the first engagement pin is engaged when the operation shaft is placed at the third speed change position and the fourth speed change position, respectively;

the second guide groove has a neutral engagement part, a first-speed-change engagement part, a second-speed-change engagement part, a third-speed-change engagement part, and a fourth-speed-change engagement part with which the second engagement pin is engaged when the operation shaft is placed at the neutral position, the first speed change position, the second speed change position, the third speed change position, and the fourth speed change position, respectively;

the third-speed-change engagement part of the first guide groove is disposed adjacent to the first-speed-change engagement part on an opposite side of the first-speed-change engagement part from the neutral engagement part, and is engaged with the first engagement pin such that the first shift fork is retained at a central reference position with respect to the axial direction relative to the first drum;

the fourth-speed-change engagement part of the first guide groove is disposed adjacent to the second-speed-change engagement part on an opposite side of the second-speed-change engagement part from the neutral engagement part, and is engaged with the first engagement pin such that the first shift fork is retained at the central reference position with respect to the axial direction relative to the first drum;

the first-speed-change engagement part, the neutral engagement part, and the second-speed-change engagement part of the second guide groove are engaged with the second engagement pin such that the second shift fork is retained at a central reference position with respect to the axial direction relative to the second drum;

the third-speed-change engagement part of the second guide groove is disposed adjacent to the first-speed-change engagement part on an opposite side of the first-speed-change engagement part from the neutral engagement part, and is engaged with the second engagement pin such that the second shift fork is retained at a first displaced position where the second shift fork is displaced from the central reference position toward the first side in the axial direction relative to the second drum; and the fourth-speed-change engagement part of the second guide groove is disposed adjacent to the second-speed-change engagement part on an opposite side of the second-speed-change engagement part from the neutral engagement part, and is engaged with the second engagement pin such that the second shift fork is retained at a second displaced position where the second shift fork is displaced from the central reference position toward the second side in the axial direction relative to the second drum.

4. The shift-drum speed change mechanism according to claim 3, further comprising a second stopper member for the second drum that defines an end of movement of the second drum toward the second side in the axial direction, and is disposed so as to provide a gap between the second stopper member for the second drum and the second drum in contact with the first stopper member for the second drum.

5. The shift-drum speed change mechanism according to claim 1, further comprising: a second slider that is supported by the power transmission rotating shaft so as to be incapable of relative rotation around the axis and movable in the axial direction between third and fourth speed change members, which are relatively rotatable relative to the power transmission rotating shaft, and is capable of selectively taking a third speed change position where the second slider is engaged with the third speed change member, a neutral position where the second slider is not engaged with any of the third and fourth speed change members, and a fourth speed change position where the second slider is engaged with the fourth speed change member; a second shift fork that is supported so as to be movable in the axial direction, and causes the second slider to move in the axial direction in accordance with its own movement in the axial direction; and a second fork spring biasing the second shift fork toward the second side in the axial direction, wherein the first drum is provided with, in addition to the first guide groove, a second guide groove into which a second engagement pin of the second shift fork is inserted;

a combined biasing force of the first and second fork springs is smaller than a biasing force of the first drum spring;

the operation shaft takes, in addition to the neutral position, the first speed change position, and the second speed change position, a third speed change position when rotated from the first speed change position toward one side around the axis and a fourth speed change position when rotated from the second speed change position toward the other side around the axis;

the first guide groove has a neutral engagement part, a first-speed-change engagement part, a second-speed-change engagement part, a third-speed-change engagement part, and a fourth-speed-change engagement part with which the first engagement pin is engaged when the operation shaft is placed at the neutral position, the first speed change position, the second speed change position, the third speed change position, and the fourth speed change position, respectively;

the second guide groove has a neutral engagement part, a first-speed-change engagement part, a second-speed-change engagement part, a third-speed-change engagement part, and a fourth-speed-change engagement part with which the second engagement pin is engaged when the operation shaft is placed at the neutral position, the first speed change position, the second speed change position, the third speed change position, and the fourth speed change position, respectively;

the third-speed-change engagement part of the first guide groove is disposed adjacent to the first-speed-change engagement part on an opposite side of the first-speed-change engagement part from the neutral engagement part, and is engaged with the first engagement pin such that the first shift fork is retained at a central reference position with respect to the axial direction relative to the first drum;

the fourth-speed-change engagement part of the first guide groove is disposed adjacent to the second-speed-change engagement part on an opposite side of the second-speed-change engagement part from the neutral engagement part, and is engaged with the first engagement pin such that the first shift fork is retained at the central reference position with respect to the axial direction relative to the first drum;

the first-speed-change engagement part, the neutral engagement part, and the second-speed-change engagement part of the second guide groove are engaged with the second engagement pin such that the second shift fork is retained at the central reference position for the second shift fork with respect to the axial direction relative to the first drum;

the third-speed-change engagement part of the second guide groove is disposed adjacent to the first-speed-change engagement part on an opposite side of the first-speed-change engagement part from the neutral engagement part, and is engaged with the second engagement pin such that the second shift fork is retained at a first displaced position for the second shift fork displaced toward the first side in the axial direction from the central reference position for the second shift fork relative to the first drum; and the fourth-speed-change engagement part of the second guide groove is disposed adjacent to the second-speed-change engagement part on an opposite side of the second-speed-change engagement part from the neutral engagement part, and is engaged with the second engagement pin such that the second shift fork is retained at a second displaced position for the second shift fork where the second shift fork is displaced toward the second side in the axial direction from the central reference position for the second shift fork relative to the first drum.

6. The shift-drum speed change mechanism according to claim 3, wherein the neutral engagement part and the fourth-speed-change engagement part of the first guide groove have such a groove width for engagement with the first engagement pin that the first shift fork is retained at the central reference position with respect to the axial direction relative to the first drum; and the second-speed-change engagement part has such a groove width for engagement with the engagement pin that the first shift fork is relatively movable with respect to the axial direction relative to the first drum between the central reference position and the second displaced position where the first shift fork is displaced from the central reference position toward the second side in the axial direction.

7. The shift-drum speed change mechanism according to claim 3, wherein the first and second shift forks are supported by a fork shaft disposed parallel to the axis of the first and second drums.

8. The shift-drum speed change mechanism according to claim 5, wherein the first and second shift forks are supported by a fork shaft disposed parallel to the axis of the first and second drums.

9. The shift-drum speed change mechanism according to claim 3, wherein the first and second shift forks are supported around the first and second drums, respectively.

10. The shift-drum speed change mechanism according to claim 5, wherein the first and second shift forks are supported around the first and second drums, respectively.

11. A shift-drum speed change mechanism comprising: first and second sliders supported by a power transmission rotating shaft so as to be incapable of relative rotation and movable in an axial direction; at least one first-slider speed change member and at least one second-slider speed change member relatively rotatable relative to the power transmission rotating shaft; first and second shift forks that are supported so as to be movable in the axial direction and, in accordance with their own movement in the axial direction, cause the first and second sliders to move in the axial direction, respectively; a drum member that has first and second guide grooves into which first and second engagement pins of the first and second shift forks are inserted, respectively, and is capable of taking around the axis at least a reference rotational position, a first-side-around-axis first rotational position when rotated predetermined degrees from the reference rotational position toward one side around the axis, and a second-side-around-axis first rotational position when rotated predetermined degrees from the reference rotational position toward the other side around the axis in accordance with manual operation; and a first fork spring biasing the first shift fork, wherein the first shift fork is capable of taking a reference position where the first slider is separated from the first-slider speed change member and a displaced position where the first slider is engaged with the first-slider speed change member so that both components are rotated integrally;

the first fork spring biases the first shift fork toward the displaced position;

the second shift fork is capable of taking a reference position where the second slider is separated from the second-slider speed change member and a displaced position where the second slider is engaged with the second-slider speed change member so that both components are rotated integrally;

the first guide groove has such a groove shape for engagement with the first engagement pin that the first shift fork is allowed to move in the axial direction between the reference position and the displaced position when the drum member is placed at the reference rotational position, the first shift fork is retained at the reference position when the drum member is placed at the first-side-around-axis first rotational position and at the second-side-around-axis first rotational position, and the first shift fork is moved toward the reference position against a biasing force of the first fork spring as an amount of rotation from the reference rotational position is increased when the drum member is rotated from the reference rotational position to the first-side-around-axis first rotational position and to the second-side-around-axis first rotational position; and the second guide groove has such a groove shape for engagement with the second engagement pin that the second shift fork is retained at the reference position when the drum member is placed at the reference rotational position, the second shift fork is moved from the reference position to the displaced position as the drum member is rotated from the reference rotational position to one of the first-side-around-axis first rotational position and the second-side-around-axis first rotational position, the second shift fork is retained at the displaced position when the drum member is placed at the one rotational position, and the second shift fork is moved from the displaced position to the reference position as the drum member is rotated from the one rotational position to the reference rotational position.

12. The shift-drum speed change mechanism according to claim 11, wherein the drum member comprises a first drum provided with the first guide groove and a second drum provided with the second guide groove, the shift-drum speed change mechanism further comprising:

a second fork spring biasing the second shift fork in the same direction as the biasing direction of the first shift fork by the first fork spring;

a first drum spring biasing the first drum with a greater biasing force than the first fork spring toward a first side in the axial direction that is a direction opposite to the biasing direction of the first shift fork by the first fork spring;

a second drum spring biasing the second drum with a greater biasing force than the second fork spring toward the first side in the axial direction;

a first stopper member for the first drum, defining an end of movement of the first drum toward the first side in the axial direction;

a second stopper member for the first drum that defines an end of movement of the first drum toward a second side opposite to the first side in the axial direction, and is disposed so as to provide a gap between the second stopper member for the first drum and the first drum in contact with the first stopper member for the first drum;

a first stopper member for the second drum, defining an end of movement of the second drum toward the first side in the axial direction; and a second stopper member for the second drum that defines an end of movement of the second drum toward the second side in the axial direction, and is disposed so as to provide a gap between the second stopper member for the second drum and the second drum in contact with the first stopper member for the second drum.

13. The shift-drum speed change mechanism according to claim 11, wherein the drum member is a single component provided with the first and second guide grooves, the shift-drum speed change mechanism further comprising:

a second fork spring biasing the second shift fork in the same direction as the biasing direction of the first shift fork by the first fork spring;

a drum spring biasing the drum member with a greater biasing force than a combined biasing force of the first fork spring and the second fork spring toward a first side in the axial direction that is a direction opposite to the biasing direction of the first shift fork by the first fork spring;

a first stopper member for the drum, defining an end of movement of the drum member toward the first side in the axial direction; and a second stopper member for the drum that defines an end of movement of the drum member toward a second side opposite to the first side in the axial direction, and is disposed so as to provide a gap between the second stopper member for the drum and the drum member in contact with the first stopper member for the drum.

14. The shift-drum speed change mechanism according to claim 11, wherein the second guide groove has such a groove shape for engagement with the second engagement pin that the second shift fork is moved from the reference position to the displaced position as the drum member is rotated from the reference rotational position to the second-side-around-axis first rotational position, the second shift fork is retained at the displaced position when the drum member is placed at the second-side-around-axis first rotational position, the second shift fork is moved from the displaced position to the reference position as the drum member is rotated from the second-side-around-axis first rotational position to the reference rotational position, and the second shift fork is retained at the reference position when the drum member is rotated between the reference rotational position and the first-side-around-axis first rotational position.

15. The shift-drum speed change mechanism according to claim 14, wherein the first-slider speed change member has a first-side-along-axis first-slider speed change member and a second-side-along-axis first-slider speed change member, disposed on the respective sides of the first slider in the axis direction;

the second-slider speed change member has a first-side-along-axis second-slider speed change member and a second-side-along-axis second-slider speed change member, disposed on the respective sides of the second slider in the axis direction;

the first shift fork separates the first slider from both the first-side-along-axis first-slider speed change member and the second-side-along-axis first-slider speed change member when placed at the reference position, and is configured to be capable of taking, as the displaced position, a first displaced position where the first slider is engaged with the first-side-along-axis first-slider speed change member so that both components are rotated integrally and a second displaced position where the first slider is engaged with the second-side-along-axis first-slider speed change member so that both components are rotated integrally;

the second shift fork separates the second slider spaced from both the first-side-along-axis second-slider speed change member and the second-side-along-axis second-slider speed change member when placed at the reference position, and is configured to be capable of taking, as the displaced position, a first displaced position where the second slider is engaged with the first-side-along-axis second-slider speed change member so that both components are rotated integrally and a second displaced position where the second slider is engaged with the second-side-along-axis second-slider speed change member so that both components are rotated integrally;

the drum member is configured so as to be capable of further taking a first-side-around-axis second rotational position when rotated predetermined degrees from the first-side-around-axis first rotational position toward one side around the axis, and a first-side-around-axis third rotational position when rotated predetermined degrees from the first-side-around-axis second rotational position toward one side around the axis;

the first guide groove further has such a groove shape for engagement with the first engagement pin that the first shift fork is retained at the first displaced position and the reference position when the drum member is placed at the first-side-around-axis second rotational position and the first-side-around-axis third rotational position, respectively; the first shift fork is moved from the reference position to the first displaced position as the drum member is rotated from the first-side-around-axis first rotational position to the first-side-around-axis second rotational position; the first shift fork is moved in an opposite direction as the drum member is rotated in an opposite direction, and the first shift fork is moved from the first displaced position to the reference position as the drum member is rotated from the first-side-around-axis second rotational position to the first-side-around-axis third rotational position, and the first shift fork is moved in an opposite direction as the drum member is rotated in an opposite direction;

the second guide groove has such a groove shape for engagement with the second engagement pin that the second shift fork is retained at the reference position when the drum member is rotated between the first-side-around-axis first rotational position and the first-side-around-axis second rotational position; the second shift fork is retained at the first displaced position when the drum member is placed at the first-side-around-axis third rotational position; and the second shift fork is moved from the reference position to the first displaced position as the drum member is rotated from the first-side-around-axis second rotational position to the first-side-around-axis third rotational position, and the second shift fork is moved in an opposite direction as the drum member is rotated in an opposite direction.

16. The shift-drum speed change mechanism according to claim 11, wherein the second-slider speed change member has a first-side-along-axis second-slider speed change member and a second-side-along-axis second-slider speed change member, disposed on the respective sides of the second slider in the axis direction;

the second shift fork separates the second slider from both the first-side-along-axis second-slider speed change member and the second-side-along-axis second-slider speed change member when placed at the reference position, and is configured to be capable of taking, as the displaced position, a first displaced position where the second slider is engaged with the first-side-along-axis second-slider speed change member so that both components are rotated integrally and a second displaced position where the second slider is engaged with the second-side-along-axis second-slider speed change member so that both components are rotated integrally; and the second guide groove has such a groove shape for engagement with the second engagement pin that the second shift fork is moved from the reference position to the second displaced position as the drum member is rotated from the reference rotational position to the second-side-around-axis first rotational position, the second shift fork is retained at the second displaced position when the drum member is placed at the second-side-around-axis first rotational position, the second shift fork is moved from the second displaced position to the reference position as the drum member is rotated from the second-side-around-axis first rotational position to the reference rotational position, the second shift fork is moved from the reference position to the first displaced position as the drum member is rotated from the reference rotational position to the first-side-around-axis first rotational position, the second shift fork is retained at the first displaced position when the drum member is placed at the first-side-around-axis first rotational position, and the second shift fork is moved from the first displaced position to the reference position as the drum member is rotated from the first-side-around-axis first rotational position to the reference rotational position.

17. The shift-drum speed change mechanism according to claim 11, wherein the first and second shift forks are supported by a fork shaft disposed parallel to the axis of the first and second drums.

18. The shift-drum speed change mechanism according to claim 11, wherein the first and second shift forks are supported around the first and second drums, respectively.

* * * * *